US008677259B2

(12) United States Patent
Flemings et al.

(10) Patent No.: US 8,677,259 B2
(45) Date of Patent: Mar. 18, 2014

(54) SYSTEM AND METHOD FOR ANNOTATING MULTIMEDIA OBJECTS

(75) Inventors: Rey Flemings, San Francisco, CA (US); Aubrey B. Anderson, San Francisco, CA (US); Jose Ericson R. de Jesus, San Francisco, CA (US); Cole J. Poelker, San Francisco, CA (US); Bruce D. McFarlane, San Francisco, CA (US); Michael Patrick Dungan, San Francisco, CA (US)

(73) Assignee: Stipple Inc., San Francisco, CA (US)

( * ) Notice: Subject to any disclaimer, the term of this patent is extended or adjusted under 35 U.S.C. 154(b) by 243 days.

(21) Appl. No.: 12/769,549

(22) Filed: Apr. 28, 2010

(65) Prior Publication Data
US 2011/0022942 A1 Jan. 27, 2011

Related U.S. Application Data

(60) Provisional application No. 61/173,482, filed on Apr. 28, 2009.

(51) Int. Cl.
*G06F 17/00* (2006.01)

(52) U.S. Cl.
USPC ........... 715/764; 715/230; 715/231; 715/232; 715/233

(58) Field of Classification Search
USPC .......................... 715/230–233, 764
See application file for complete search history.

(56) References Cited

U.S. PATENT DOCUMENTS

| 5,855,008 | A | 12/1998 | Goldhaber et al. |
| 6,307,573 | B1* | 10/2001 | Barros .................. 715/764 |
| 7,346,561 | B1 | 3/2008 | Devitt et al. |
| 7,596,549 | B1* | 9/2009 | Issa et al. .................. 1/1 |
| 8,234,185 | B2 | 7/2012 | Davis |
| 2004/0139391 | A1* | 7/2004 | Stumbo et al. .............. 715/512 |
| 2006/0036585 | A1* | 2/2006 | King et al. ................ 707/3 |
| 2007/0276928 | A1* | 11/2007 | Rhoads et al. ............. 709/219 |
| 2007/0300142 | A1* | 12/2007 | King et al. ................ 715/500 |
| 2008/0259184 | A1* | 10/2008 | Shingu et al. ............ 348/231.99 |
| 2010/0235259 | A1 | 9/2010 | Farraro et al. |
| 2011/0299832 | A1 | 12/2011 | Butcher |
| 2013/0024324 | A1 | 1/2013 | Davis, Jr. |
| 2013/0024755 | A1 | 1/2013 | Isaac |

OTHER PUBLICATIONS

PCT International Search Report and Written Opinion, PCT Application No. PCT/US10/32848, Jul. 2, 2010, 9 pages.

* cited by examiner

*Primary Examiner* — Nathan Hillery
(74) *Attorney, Agent, or Firm* — Fenwick & West LLP

(57) ABSTRACT

The system and a computer-implemented method annotate a multimedia object on a web page hosted on a publisher computer system. A web page that includes a multimedia object is rendered in a web browser of a client computer system. One or more layers, including a transparent layer, at least partially located over the multimedia object displayed on the web page are generated wherein the one or more layers are configured to facilitate the creation and display of annotation data for the multimedia object based on user interface events produced by a user of the client computer system. Annotation data for the multimedia object is received from the user. The annotation data is transmitted to an annotation server for storage. A visual indicator indicating that the annotation data is associated with the multimedia object is displayed, wherein the visual indicator is rendered in the one or more layers.

17 Claims, 28 Drawing Sheets

10

901

Permissions
Annotate
☒ All Users
☐ Registered Users
☐ Designated Users

902

Designated Users and Roles
User 910    Administator
User 911    Annotate
User 912    Annotate Add Designated User [____] (Submit)

URLs to Multimedia Objects
URL 920
URL 921
URL 922
URL 923
URL 924

904

Tokens
Token 930
Token 931
Token 932
Token 933
Token 934

Program URL 950

Add URL [____] (Submit)

Share with Sites
Site 940
Site 941

906

Add Site [____] (Submit)

FIGURE 9

SYSTEM AND METHOD FOR ANNOTATING MULTIMEDIA OBJECTS

This patent application claims priority to U.S. Provisional Patent Application 61/173,482 filed on Apr. 28, 2009 and incorporated by reference herein in its entirety.

1. FIELD

The disclosed embodiments relate generally to multimedia content. More particularly, the disclosed embodiments relate to systems and methods for annotating multimedia content.

2. BACKGROUND

Multimedia content is often included in a web page to enhance the usability of the web page. For example, a retailer may include images and/or videos along with a textual description of an item for sale. Similarly, a news website may include images and/or videos related to a news article. In both cases, a publisher of the web page controls the content of the web page, including any description of the multimedia objects included in the web page. Although some websites allow users to leave comments on a web page, these comments are typically relegated to a separate section of the web page (e.g., a separate comments frame adjacent to the content provided by the publisher of the web page). However, users currently cannot annotate a particular multimedia object in the web page.

SUMMARY OF THE SYSTEM

It is desirable to allow users to annotate a multimedia object on a web page. For example, consider a web page that includes celebrity news and photographs. A user of the website may wish to inquire about an item of clothing that a celebrity is wearing in a photograph on the web page. Unfortunately, there is presently no mechanism that allows users to annotate specified portions of images (e.g., photographs or other multimedia objects) on a web page of a publisher. Thus, if a user desires to make a comment about the particular item of clothing in the photograph in the web page, the only option is for the user to leave a general comment on the web page itself. Since the comment is separate from the multimedia object on which the comment is made, other users may not see the comment or may not be able to identify the subject of the comment (e.g., the particular item of clothing in the particular photograph).

To address the above-described drawbacks, some embodiments of the system provide a computer readable storage medium including instructions, and a computer-implemented method for creating and displaying annotations for a multimedia object on a web page.

Some embodiments of the system provide a computer readable storage medium including instructions, and a computer-implemented method for annotating a multimedia object on a web page hosted on a publisher computer system. A web page that includes a multimedia object is rendered in a web browser of a client computer system, wherein the web page is hosted on a publisher computer system. One or more layers, including a transparent layer, at least partially located over the multimedia object displayed on the web page are generated, wherein the one or more layers are configured to facilitate the creation and display of annotation data for the multimedia object based on user interface events produced by a user of the client computer system. Annotation data for the multimedia object is received from the user. The annotation data is transmitted to an annotation server for storage. A visual indicator indicating that the annotation data is associated with the multimedia object is displayed, wherein the visual indicator is rendered in the one or more layers.

In some embodiments, prior to rendering the web page that includes the multimedia object in the web browser of the client computer system, the web page is requested and received from the publisher computer system.

In some embodiments, the web page includes a program wherein the program is configured to create the one or more layers located over one or more multimedia objects of a web page being displayed in the web browser of the client computer system, and wherein the one or more layers are used to facilitate the creation and display of annotation data for the one or more multimedia objects of the web page.

In some embodiments, the program is hosted on the annotation server.

In some embodiments, the program is included with source code for the web page.

In some embodiments, prior to receiving the annotation data for the multimedia object from the user, a request to annotate the multimedia object is received from the user, the request including a specified location within the multimedia object at which to associate the annotation data. A form for annotating the multimedia object is presented in the web browser of the client computer system.

In some embodiments, the specified location includes a specified pixel of the multimedia object and/or a specified area within the multimedia object.

In some embodiments, a request is received from the user for a second web page hosted on the publisher computer system, the second web page including the program and one or more multimedia objects, the one or more multimedia objects including a second multimedia object associated with annotation data. The second web page is received from the publisher computer system. The second web page is rendered in the web browser of the client computer system. The second multimedia object is identified and at least one layer, including a transparent layer, at least partially located over the second multimedia object is generated.

In some embodiments, the annotation data for the second multimedia object is requested and received from the annotation server. The annotation data for the second multimedia object is associated with the at least one layer at least partially located over the second multimedia object.

In some embodiments, when a cursor of a user interface of the client computer system is within a specified distance of the second multimedia object, visual indicators are displayed on the second multimedia object to indicate the presence of the second multimedia object.

In some embodiments, the visual indicators are displayed on the second multimedia object as follows. Locations within the second multimedia object that are associated with annotation data are determined. The visual indicators are displayed at the locations within the second multimedia object associated with annotation data in accordance with the annotation data for the multimedia object associated with annotation data.

In some embodiments, the visual indicators include a visual indicator located at a specified pixel of the second multimedia object and/or a visual indicator including a specified area of the second multimedia object.

In some embodiments, the visual indicators include a first visual indicator. A first user interface event indicating that the first visual indicator was selected by the user is received. A subset of the annotation data associated with the first visual indicator and a link to a third web page hosted on the annotation server including the annotation data associated with the first visual indicator is displayed in the web browser of the client computer system.

In some embodiments, a second user interface event indicating that the link to the third web page was selected by the user is received. The third web page is requested and received from the annotation server. The third web page is rendered in the web browser of the client computer system.

In some embodiments, the annotation data includes a file name of the multimedia object, locations within the multimedia object with which the annotation data is associated, text, a universal resource locator, and any combination of the aforementioned items.

In some embodiments, the multimedia object includes an image, a video clip, an audio clip, text, or any combination of the aforementioned multimedia objects.

In some embodiments, the user is not associated with the publisher of the web page.

In some embodiments, a second user of a second client computer system can view and add additional annotation data to the annotation data added by the first user.

Some embodiments provide a system, a computer readable storage medium including instructions, and a computer-implemented method for creating annotation data for a multimedia object on a web page hosted on a publisher computer system. A first request for a program that is executable within the web browser of the first client computer system is received from a web browser of a first client computer system, wherein the program is configured to create one or more layers, including a transparent layer, at least partially located over a multimedia object of a web page being displayed in the web browser of the first client computer system, and wherein the one or more layers are used to facilitate the creation and display of annotation data for the multimedia object. The program is sent to the web browser of the first client computer system. A second request to associate annotation data with a first multimedia object of a first web page hosted on the publisher computer system is received from the web browser of the first client computer system, the second request including annotation data for the first multimedia object. The annotation data is stored in a database of the annotation server.

In some embodiments, prior to storing the annotation data in the database of the annotation server, security settings for the first multimedia object are verified. The annotation data is stored in the database of the annotation server only if the security settings indicate that the first multimedia object may be annotated.

In some embodiments, prior to storing the annotation data in the database of the annotation server, it is determined whether the annotation data includes a location that is within a specified distance of an existing location included in an existing annotation record for the first multimedia object in the database of the annotation server. In response to determining that the location is within the specified distance of an existing location included in an existing annotation record for the first multimedia object, the annotation data is associated with the existing annotation record in the database of the annotation server and the annotation data is stored in the database of the annotation server.

In some embodiments, in response to determining that the location is not within the specified distance of an existing location included in an existing annotation record for the first multimedia object, a new annotation record for the first multimedia object is created in the database of the annotation server. The annotation data is stored in the database of the annotation server.

In some embodiments, a third request for the program is received from a second web browser of a second client computer system. The program is sent to the second web browser of the second client computer system. A fourth request for annotation data for the first multimedia object of the web page is received from the second web browser of the second client computer system. The annotation data for the first multimedia object of the web page is retrieved from the database of the annotation server. The annotation data is sent to the second web browser of the second client computer system, wherein the second web browser of the second client computer system creates one or more layers located on the first multimedia object, and wherein the one or more layers include the annotation data.

In some embodiments, prior to retrieving from the database of the annotation server the annotation data for the first multimedia object of the web page, security settings for the first multimedia object are verified. The annotation data for the first multimedia object of the web page is retrieved from the database of the annotation server only if the security settings indicate that the first multimedia object may be annotated.

In some embodiments, a fifth request for a second web page including the annotation data for the first multimedia object is received from the second web browser of the second client computer System. The second web page is sent to the second web browser of the second client computer system.

In some embodiments, a sixth request to associate a second multimedia object with annotation data is received from a third web browser of a third client computer system, the sixth request including a corresponding link for the second multimedia object, wherein the second multimedia object is hosted on the publisher computer system. A unique identifier for the second multimedia object is created. The corresponding link for the second multimedia object and the unique identifier is stored in the database of the annotation server. The unique identifier and a link for the program are sent to the third web browser of the third client computer system.

The embodiments described herein provide a system where the annotation data may be associated with multimedia objects by users who are not affiliated with a publisher and/or who do have administrative access to a publisher's computer system. In other words, any user on the Internet (subject to restrictions established by the publisher as described herein) may annotate multimedia objects hosted on the publisher's computer system. Moreover, the publisher only needs to make minimal changes to the publisher's website (e.g., adding unique identifiers for multimedia objects that users may annotate and adding a link to a program that creates and displays annotation data, etc.).

Although the embodiments described herein are typically applied to images (e.g., photographs, etc.), the embodiments described herein may be applied to other types of multimedia objects such as video clips, text, audio clips, and the like.

BRIEF DESCRIPTION OF THE DRAWINGS

FIG. 9 is a block diagram of an administration web page, according to some embodiments.

Like reference numerals refer to corresponding parts throughout the drawings.

DETAILED DESCRIPTION

The system provides a method and apparatus for publishers and/or users to add annotations to multimedia objects on a web page. The users may or may not have annotation privileges for a particular multimedia object on a web page, as determined by a publisher. When a user does have annotation privileges, the system allows the user to place an annotation object on the multimedia object and associate additional data with the annotation object. The additional data may include text, URL's, and/or other multimedia objects. The annotation object may be an area, region, point, or the like, and it may be invisible until and unless a cursor passes over or within a predetermined distance of the annotation object. When that occurs, the annotation object becomes visible in some manner, such as a visible dot, square, outline, or other manner of indicating the presence of an annotation object.

Figure 1:
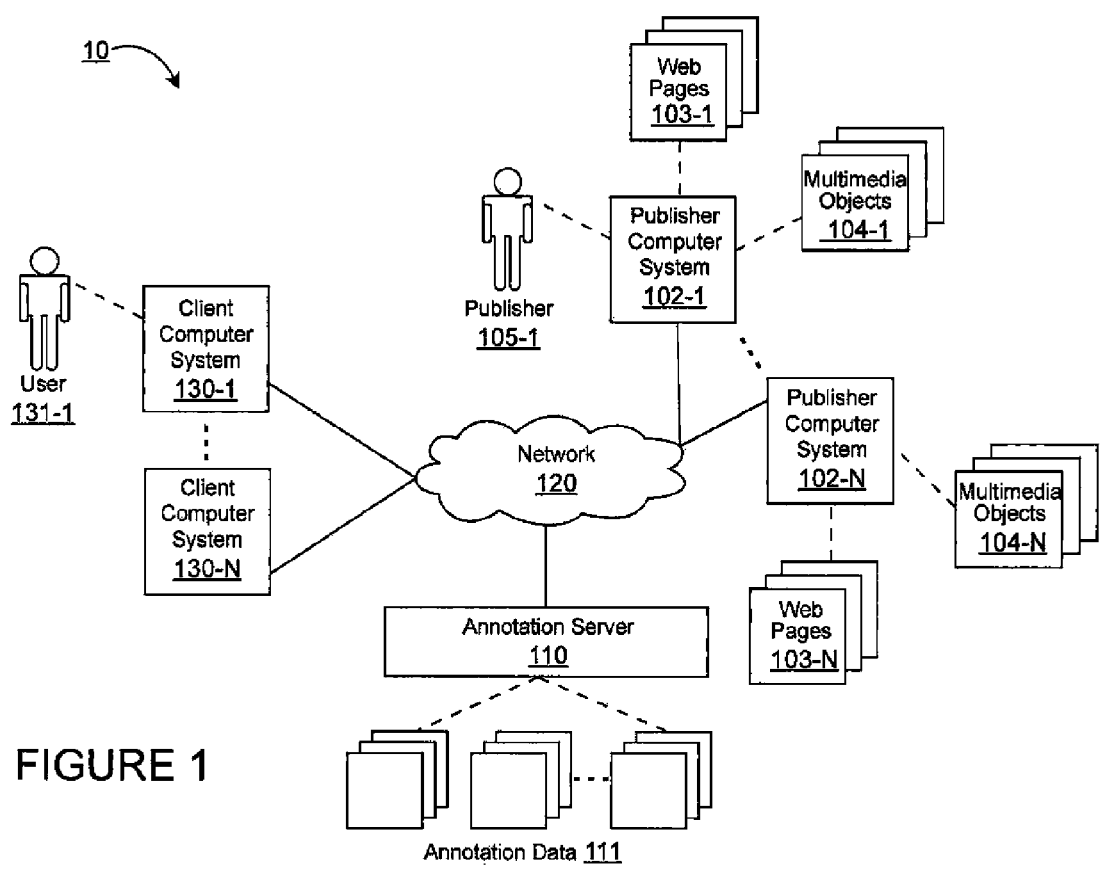
FIG. 1 is a block diagram of a system for creating and annotating multimedia objects on a web page, according to some embodiments.

FIG. 1 is a block diagram 100 of a system for creating and annotating multimedia objects on a web page, according to some embodiments. FIG. 1 includes one or more publisher computer systems 102 including publisher computer systems 102-1 to 102-N, an annotation server 110, and one or more client computer systems 130 including client computers systems 130-1 to 130-N. The publisher computers systems may be maintained or controlled by a publisher 105-1. The one or more publisher computer systems 102, the annotation server 110, and the one or more client computer systems 130 are coupled to a network 120. The network 120 may include any type of wired or wireless communication channel capable of coupling together computing nodes. This includes, but is not limited to, a local area network, a wide area network, or a combination of networks. In some embodiments, the network 120 includes the Internet. In some embodiments, the client computer systems 130 include a desktop computer system, laptop computer system, a personal digital assistant, a smart phone, a mobile phone, a set-top box, or the like. The client computers systems 130 may be used by user 131-1.

The publisher computer systems 102 may host and/or serve web pages 103 including web pages 103-1 to 103-N and multimedia objects 104 including multimedia objects 104-1 to 104-N. Each web page 103 on a publisher computer system 102 may include one or more multimedia objects 104. A particular web page 103 may include source code (e.g., HTML source code), programs (e.g., JavaScript, etc.), multimedia objects (e.g., images, audio, videos, etc), XML content, etc. In some embodiments, a multimedia object is an image. In some embodiments, a multimedia object is a video clip. In some embodiments, a multimedia object is an audio clip. In some embodiments, a multimedia object is text. In some embodiments, a multimedia object is made up of one or more of images, video, audio, and text.

The publisher computer systems 102 include programs, modules, and data structures, or a subset thereof, to receive requests, generate responses to the requests, and to respond to the requests to access the web pages 103 and/or the multimedia objects 104 from the client computer systems 130 and/or the annotation server 110.

In some embodiments, publisher 105-1 may maintain content on the publisher computer system 102-1. For example, the publisher 105-1 (e.g., a magazine publisher) may maintain web pages 103-1 and multimedia objects 104-1 (e.g., photographs and videos, etc.) on the publisher computer system 102-1. As described above, a user 131-1 is typically not able to annotate the multimedia objects 104-1 located on the publisher computer system 102-1. In order to overcome these drawbacks, some embodiments provide an annotation server (e.g., the annotation server 110) that receives annotation data 111 from users (e.g., the user 131-1) for annotating multimedia objects (e.g., the multimedia objects 104-1) located on publisher computer systems (e.g., the publisher computer systems 102-1). The annotation server also provides the annotation data 111 to users for multimedia objects that have been annotated by users. In some embodiments, the user 131-1 is not associated with the publisher 105-1.

In some embodiments, the publisher 105-1 designates a subset of the multimedia objects 104-1 that users may annotate. In these embodiments, the publisher 105-1 may designate the subset of the multimedia objects 104-1 that may be annotated by users via an administration web page on the annotation server 110 (e.g., see FIG. 9). For example, the administration web page may include options to select a subset of the one or more multimedia objects 104-1 that may be annotated by users. In some embodiments, after enabling annotations on the annotation server 110 for a subset of the one or more multimedia objects 104-1, the publisher 105-1 inserts specified tokens into one or more of the web pages 103-1 that include multimedia objects in the subset of multimedia objects 104-1 to indicate that the multimedia objects include annotation data. For example, consider a web page that includes a multimedia object where the publisher 105-1 has allowed user annotations. If the multimedia object is an image, the publisher 105-1 may insert a special token into the HTML IMG tag for the image to indicate that the image may include annotations. In some embodiments, the special token is inserted in a HTML "class" attribute-value pair in an HTML tag (e.g., an IMG tag).

In some embodiments, when the user 131-1 uses the client computer system 130-1 to request a web page from the publisher computer system 102-1 that includes one or more multimedia objects that may include annotation data, the publisher computer system 102-1 transmits the web page, the one or more multimedia objects for the web page, and a program to the client computer system 130-1 via the network 120. In some embodiments, the program is hosted on the annotation server 110. In these embodiments, the annotation server 110 transmits the program to the client computer system 130-1 in response to a request from the client computer system 130-1 to retrieve the program from the annotation server 110. A browser module (or engine) on the client computer system 130-1 processes the web page and displays the web page and the one or more multimedia objects. The browser module may include a parsing module configured to parse web pages, a requesting module configured to request web pages, programs, and/or multimedia objects, a rendering module configured to render the requested web pages and/or multimedia objects, configured to execute programs. The browser module on the client computer system 130-1 also executes the program sent by the publisher computer system 102-1.

In some embodiments, the program includes instructions to identify multimedia objects in the web page that include annotations and/or instructions to create one or more layers at least partially located over the multimedia objects, wherein the one or more layers are used to facilitate the creation and/or display of annotation data associated with the multimedia objects. For example, the program identifies HTML tags that include a specified token. The program then instructs the browser module to request the annotation data from the annotation server 110 and to display the annotation data to the user 131-1 in the user interface of the client computer system 130-1. Note that these embodiments are described in more detail below.

Figure 2:
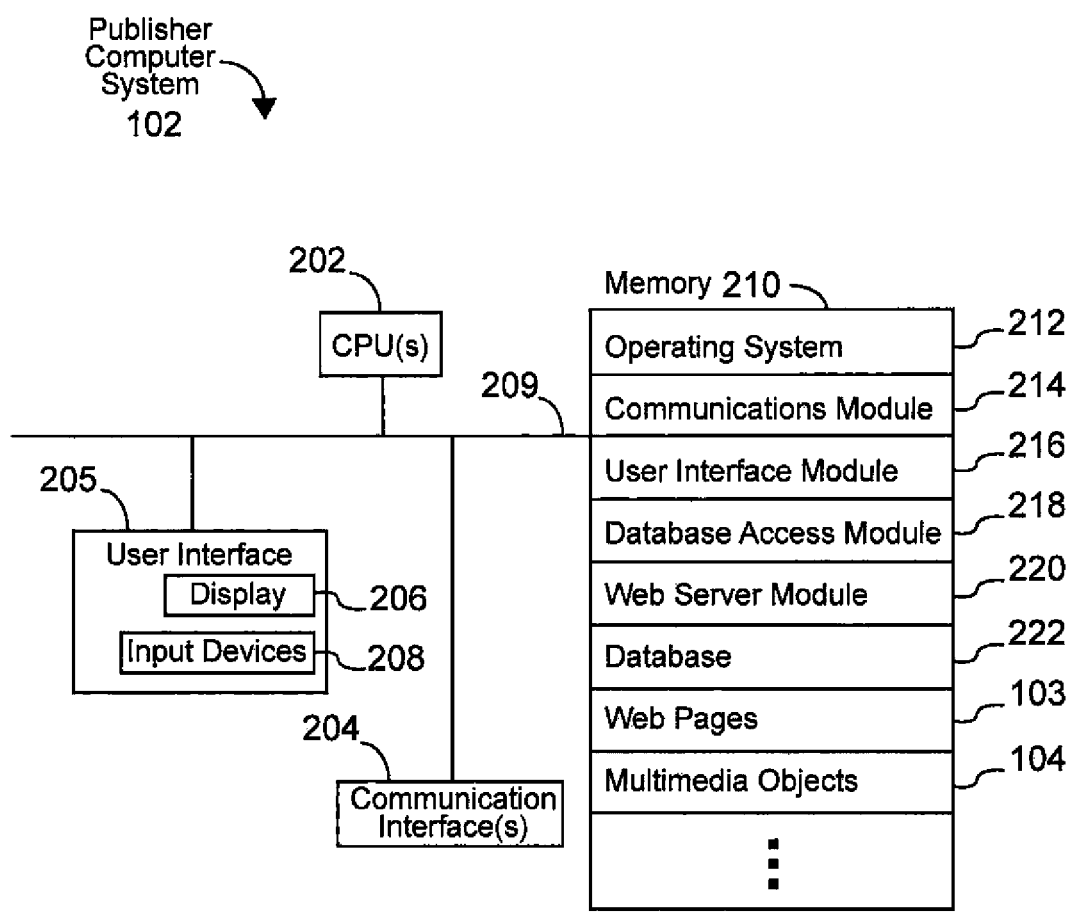
FIG. 2 is a block diagram of the publisher computer system shown in FIG. 1, according to some embodiments.

FIG. 2 is a block diagram illustrating the publisher computer system 102 shown in FIG. 1. The publisher computer system 102 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The publisher computer system 102 optionally may include a user interface 205 comprising a display device 206 (e.g., a touch screen display, etc.) and input devices 208 (e.g., keyboard, mouse, touch screen, keypads, etc.). In some embodiments, the input devices are on-screen input devices. Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:

- an operating system 212 that includes procedures for handling various basic system services and for perforating hardware dependent tasks;
- a communication module 214 that is used for connecting the publisher computer system 102 to other systems (e.g., the client computer systems 130, the annotation server 110, etc.) via the one or more communication interfaces 204 (wired or wireless) and one or more communication networks, such as the Internet, other wide area networks, local area networks, metropolitan area networks, and so on;
- a user interface module 216 that receives commands from the user via the input devices 208 and generates user interface objects on the display device 206;
- a database access module 218 that provides access to (e.g., read, write, update, select, etc.) a database 222;
- a web server module 220 that receives requests for web pages and/or multimedia objects, processes the request, and transmits the requested web pages and/or multimedia objects via the one or more communication interfaces 204;
- web pages 103; and
- multimedia objects 104.

Although not shown in FIG. 2, in some embodiments the publisher computer system 102 may include an annotation model and include annotation data in the database 222.

Although FIG. 2 shows a "publisher computer system," FIG. 2 is intended more as functional description of the various features that may be present in a set of publisher computer systems than as a structural schematic of the embodiments described herein. In practice, and as recognized by those of ordinary skill in the art, items shown separately could be combined and some items could be separated. For example, some items shown separately in FIG. 2 may be implemented on a single system and single items may be implemented by one or more systems. The actual number of systems used to implement a publisher computer system and how features are allocated among them will vary from one implementation to another, and may depend in part on the amount of data traffic that the system must handle during peak usage periods as well as during average usage periods.

Figure 3:
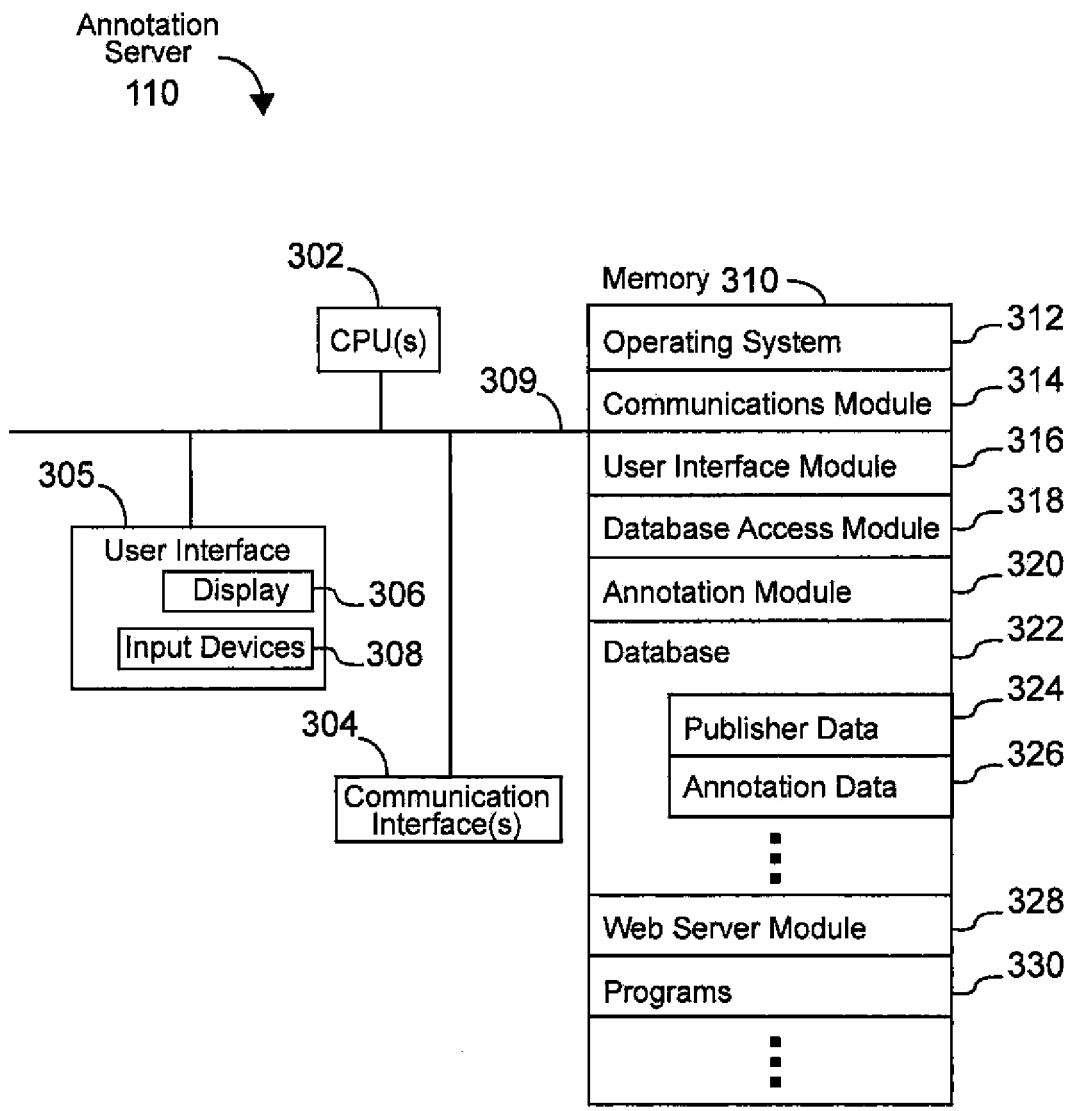
FIG. 3 is a block diagram illustrating the annotation server shown in FIG. 1, according to some embodiments.

FIG. 3 is a block diagram illustrating the annotation server 110 shown in FIG. 1. The annotation server 110 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The annotation server 110 optionally may include a user interface 305 comprising a display device 306 (e.g., a touch screen display, etc.) and input devices 308 (e.g., keyboard, mouse, touch screen, keypads, etc.). In some embodiments, the input devices are on-screen input devices. Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a computer readable storage medium. In some embodiments, memory 310 stores the following programs, modules and data structures, or a subset thereof:

- an operating system 312 that includes procedures for handling various basic system services and for performing hardware dependent tasks;
- a communication module 314 that is used for connecting the annotation server 110 to other systems (e.g., the client computer systems 130, the publisher computer systems 130, etc.) via the one or more communication interfaces 304 (wired or wireless) and one or more communication networks, such as the Internet, other wide area networks, local area networks, metropolitan area networks, and so on;
- a user interface module 316 that receives commands from the user via the input devices 308 and generates user interface objects on the display device 306;
- a database access module 318 that provides access to (e.g., read, write, update, select, etc.) a database 322;
- an annotation module 320 that generates, receives, and/or provides annotation data for multimedia objects from users via the one or more communication interfaces 304, as described herein;
- the database 322 that includes publisher data 324 (e.g., account data for publishers, URLs for multimedia objects that may be annotated by users, etc.) and annotation data 326 (e.g., data associated with multimedia objects on publisher computer systems, etc.), as described herein; and
- a web server module 328 that receives requests for web pages and/or multimedia objects, processes the request, and transmits the requested web pages and/or multimedia objects via the one or more communication interfaces 304.
- programs 330 that are used by the client computer systems 130 to create and/or display user-created annotations of the multimedia objects 104.

Although FIG. 3 shows an "annotation server," FIG. 3 is intended more as functional description of the various features that may be present in a set of annotation servers than as a structural schematic of the embodiments described herein. In practice, and as recognized by those of ordinary skill in the art, items shown separately could be combined and some items could be separated. For example, some items shown separately in FIG. 3 may be implemented on a single server and single items may be implemented by one or more servers. The actual number of servers used to implement an annotation server and how features are allocated among them will vary from one implementation to another, and may depend in part on the amount of data traffic that the server must handle during peak usage periods as well as during average usage periods.

Figure 4:
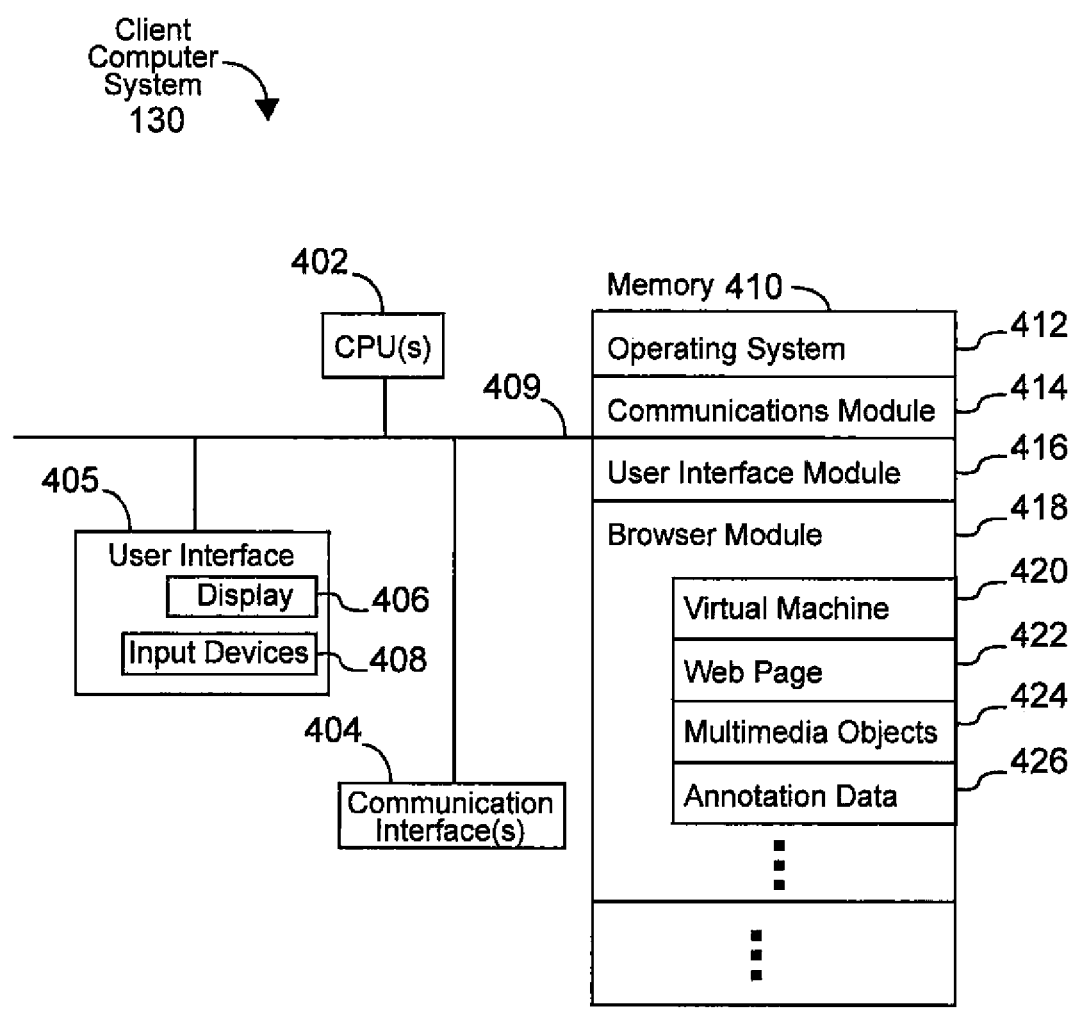
FIG. 4 is a block diagram illustrating the client computer system shown in FIG. 1, according to some embodiments.

FIG. 4 is a block diagram illustrating the client computer system 130 shown in FIG. 1. The client computer system 130 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. The client computer system 130 optionally may include a user interface 405 comprising a display device 406 (e.g., a touch screen display, etc.) and input devices 408 (e.g., keyboard, mouse, touch screen, keypads, etc.). In some embodiments, the input devices are on-screen input devices. Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 stores the following programs, modules and data structures, or a subset thereof:

- an operating system 412 that includes procedures for handling various basic system services and for performing hardware dependent tasks;
- a communication module 414 that is used for connecting the client computer system 130 to other systems (e.g., the publisher computer systems 102, the annotation server 110, etc.) via the one or more communication interfaces 404 (wired or wireless) and one or more communication networks, such as the Internet, other wide area networks, local area networks, metropolitan area networks, and so on;
- a user interface module 416 that receives commands from the user via the input devices 408 and generates user interface objects on the display device 406; and
- a browser module 418 that includes a virtual machine 420 configured to execute programs and that is configured to process and display web pages 422, multimedia objects 424, annotation data 426, as described herein.

Although FIG. 4 shows a "client computer system," FIG. 4 is intended more as functional description of the various features that may be present in a client computer system than as a structural schematic of the embodiments described herein. In practice, and as recognized by those of ordinary skill in the art, items shown separately could be combined and some items could be separated.

Each of the above identified elements in FIGS. 2-4 may be stored in one or more of the previously mentioned memory devices, and correspond to a set of instructions for performing a function described above. The set of instructions may be executed by one or more processors (e.g., the CPUs 202,302, and 402). The above identified modules or programs (i.e., sets of instructions) need not be implemented as separate software programs, procedures or modules, and thus various subsets of these modules may be combined or otherwise re-arranged in various embodiments. In some embodiments, each of memory 210, 310, and 410 may store a subset of the modules and data structures identified above. Furthermore, each of memory 210, 310, and 410 may store additional modules and data structures not described above.

Displaying Annotations

FIGS. 5A-5F are a series of block diagrams illustrating a web page that includes a multimedia object 502 that is displayed in a browser window 501 in a user interface of a computer system (e.g., the client computer system 130 in FIG. 1). The web page may also include content 503 (e.g., text, advertisements, etc.). In some embodiments, annotation data is associated with the multimedia object 502. The annotation data may be associated with a specified point within the displayed multimedia object 502. Similarly, the annotation data may be associated with a specified area within the displayed multimedia object 502 (e.g., defined by a freeform shape, a polygon, etc.). Thus, the multimedia object 502 may be associated with one or more sets of annotation data, each of which refer to respective location within the displayed multimedia object 502.

Figure 5A:
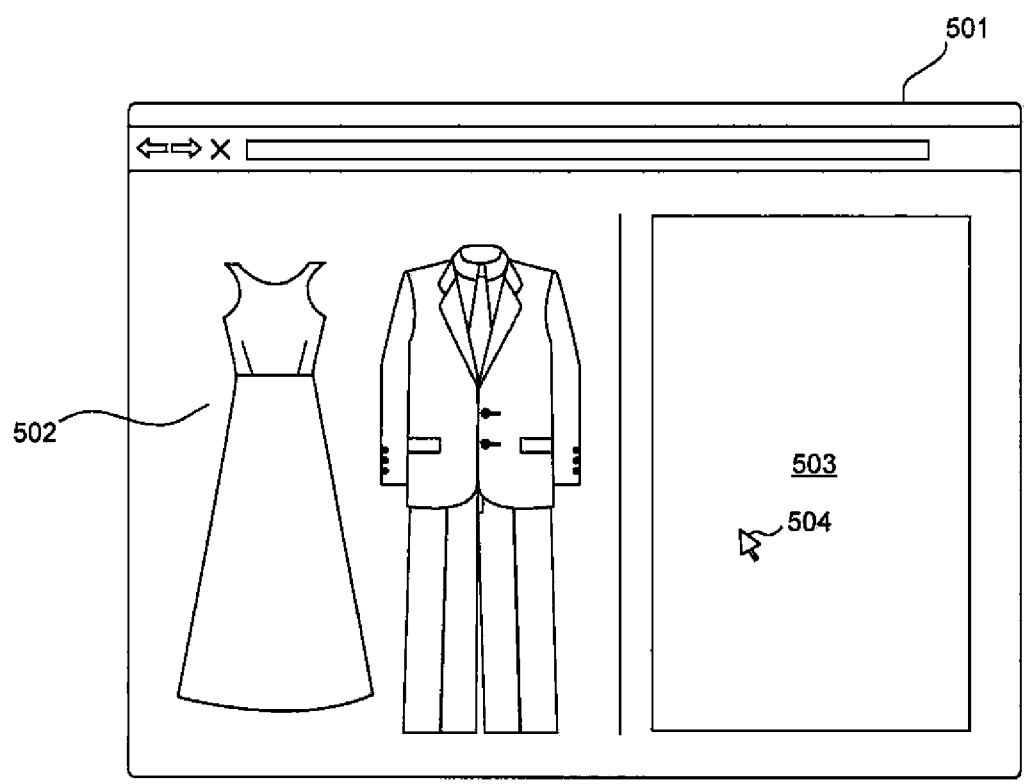
FIG. 5A illustrates a web page that includes a multimedia object, according to some embodiments.

In some embodiments, if a cursor 504 of the user interface of the client computer system is not within a specified distance of a multimedia object that is associated with annotation data, the client computer system does not display visual indicators associated with the annotation data in the browser window 501, as shown in FIG. 5A.

Figure 5B:
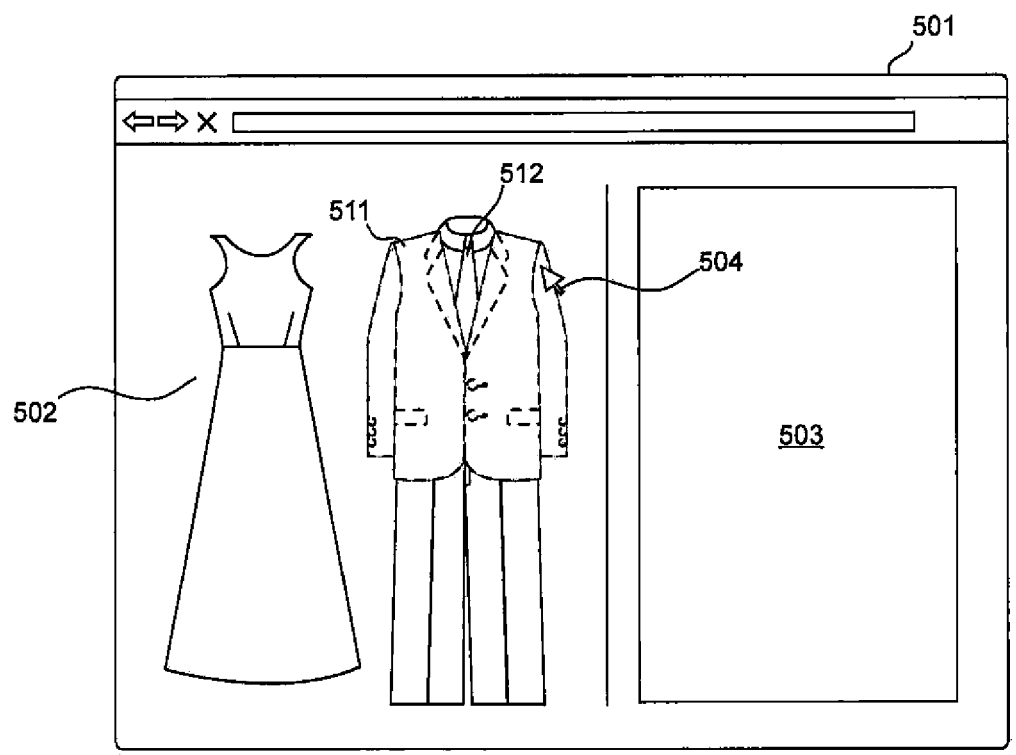
FIG. 5B illustrates the web page that includes visual indicators for annotations associated with the multimedia object, according to some embodiments.
Figure 5C:
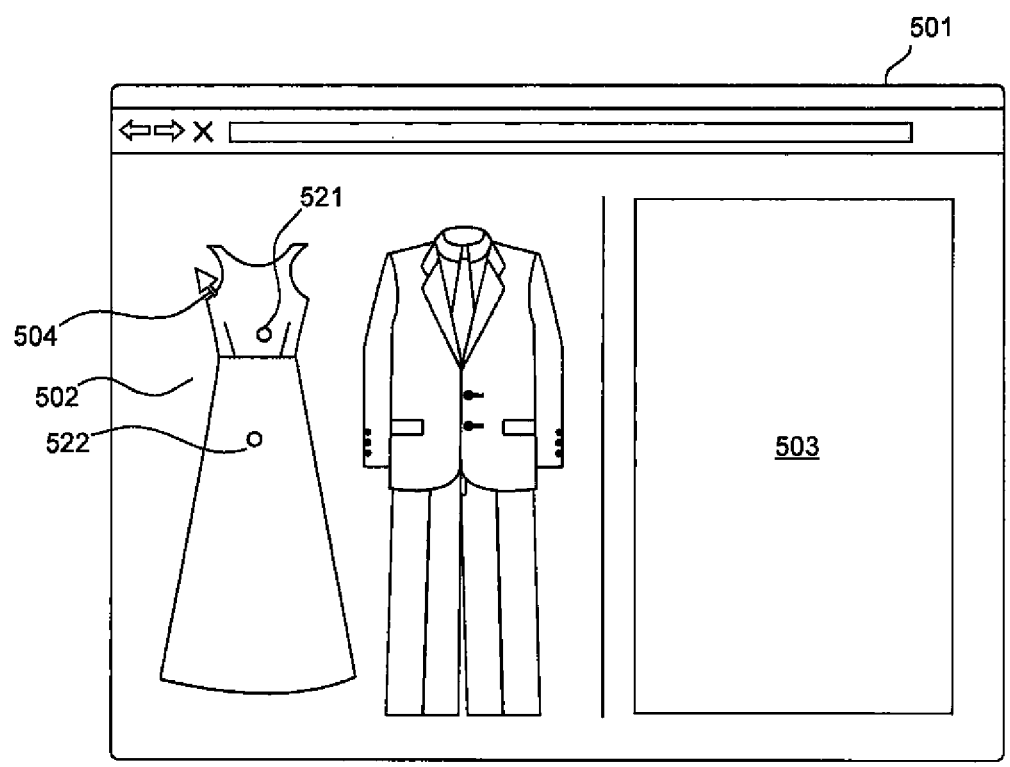
FIG. 5C illustrates the web page that includes visual indicators for annotations associated with the multimedia object, according to some embodiments.

In some embodiments, if the cursor 504 of the user interface of the client computer system is within the specified distance of the multimedia object that is associated with annotation data, the client computer system displays a visual indicator in the browser window 501 to indicate that annotation data is associated with at least part of the displayed multimedia object 502. For example, the visual indicators may include a point or an area. These embodiments are illustrated in FIGS. 5B and 5C, where visual indicators 511-512 (e.g., annotation areas including the suit and the tie, respectively) and visual indicators 521-522 (e.g., annotation points) are displayed based on the location of the cursor 504, respectively. In some embodiments, the visual indicator is a question mark. The question mark may be displayed when the client computer system determines that the annotation data associated with the multimedia object includes a question.

In some embodiments, the visual indicators are displayed when a user clicks on a multimedia object associated with annotation data. In some embodiments, the visual indicators are displayed when the user moves the cursor 504 over a multimedia object associated with annotation data. In some embodiments, the visual indicators toggle on and off in response to an action performed by the user. Such actions may include mousing over the multimedia object or be clicking a button or check box associated with the multimedia object and/or web page.

In some embodiments, the moving of the cursor over the multimedia object reveals all annotation objects contained in the image. In other words, all the annotation indicators become visible when the cursor is anywhere over the image. In other embodiments, only the one, two, or some small number of annotation indicators nearest the position of the cursor are made visible. As the user moves the cursor over the image, the annotation objects located nearest the cursor are made visible near the cursor position and remain invisible, or prior visible annotation indicators are made invisible, as the cursor is moved over the image. In one embodiments, previously visible annotation indicators fade slowly to invisibility as the cursor moves away. In another embodiment, the annotation indicators have a scale of visibility dependent on proximity to the cursor, with those being closest to the cursor being fully visible and those further away being only partially visible.

In another embodiment, the system may include an action that will display a list and short description of all of the annotation objects of a multimedia object. If the user places the mouse over, or clicks on, an item in the list, the corresponding visual indicator of that annotation object will become visible so that the user can visually associate the description of the annotation object with the location of the annotation object. In another embodiment, all of the visual indicators of the annotation objects are made visible when the comprehensive list of annotation objects is displayed, and when a user selects one of the short descriptions, the associated visual indicator will brighten or flash, for example, to indicate its association with the item in the list.

As noted in FIG. 5B, the visual indicator of an annotation object may be an area or region. In FIG. 5B, the tie is defined as one annotation object and is coincident with the borders of the tie itself. Similarly, the suit jacket is a second annotation object and is defined by the boundaries of the suit jacket. FIG. 5C shows that annotation objects may be simply small dots or circles 521 and 522.

Figure 5D:
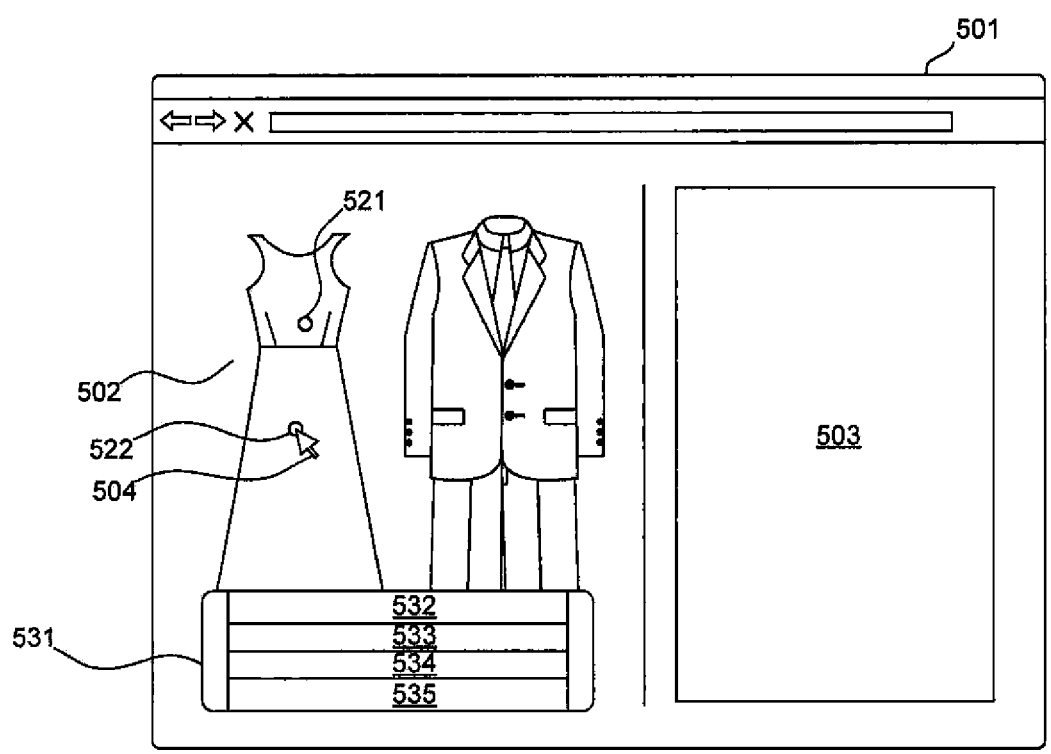
FIG. 5D illustrates the web page after a user has selected a visual indicator for an annotation associated with the multimedia object, according to some embodiments.

In some embodiments, the client computer system receives a first user interface event (e.g., a mouse click) indicating that the user selected a visual indicator. In response to the first user interface event, the client computer system displays a subset of the annotation data associated with the multimedia object. These embodiments are illustrated in FIG. 5D, where the user clicked on the visual indicator 522. In response to clicking on the visual indicator 522, the client computer system presents the annotation data 531 in the browser window 501. The annotation data 531 may include one or more snippets of the annotation data and/or universal resource locators (URLs) to a web page generated by the annotation server 110 based on the annotation data for the multimedia object. The subset of annotation data may be displayed in any one of several locations. In the example of FIG. 5D, the subset of annotation data is displayed near the bottom of the multimedia object 502. The subset of annotation data may also be displayed directly at the location of the visual indicator, or may be displayed in some other place on the web page, even away from the multimedia object, as desired without departing from the scope and spirit of the system.

Figure 5E:
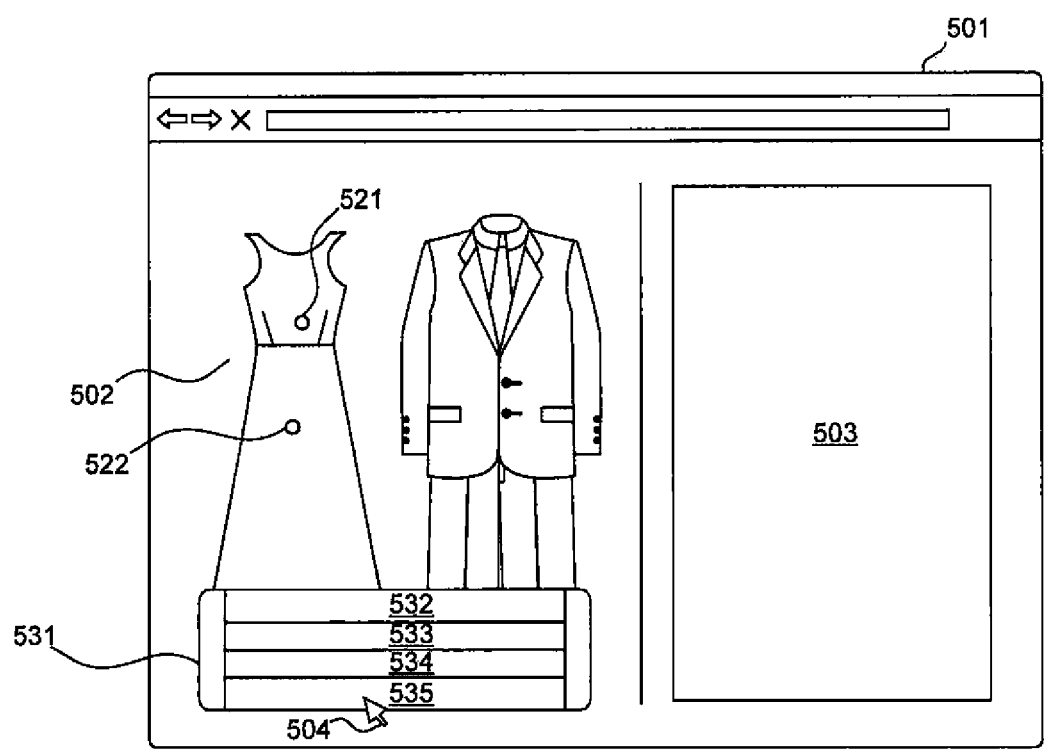
FIG. 5E illustrates the web page after a user selected a visual indicator for an annotation associated with the multimedia object, according to some embodiments.
Figure 5F:
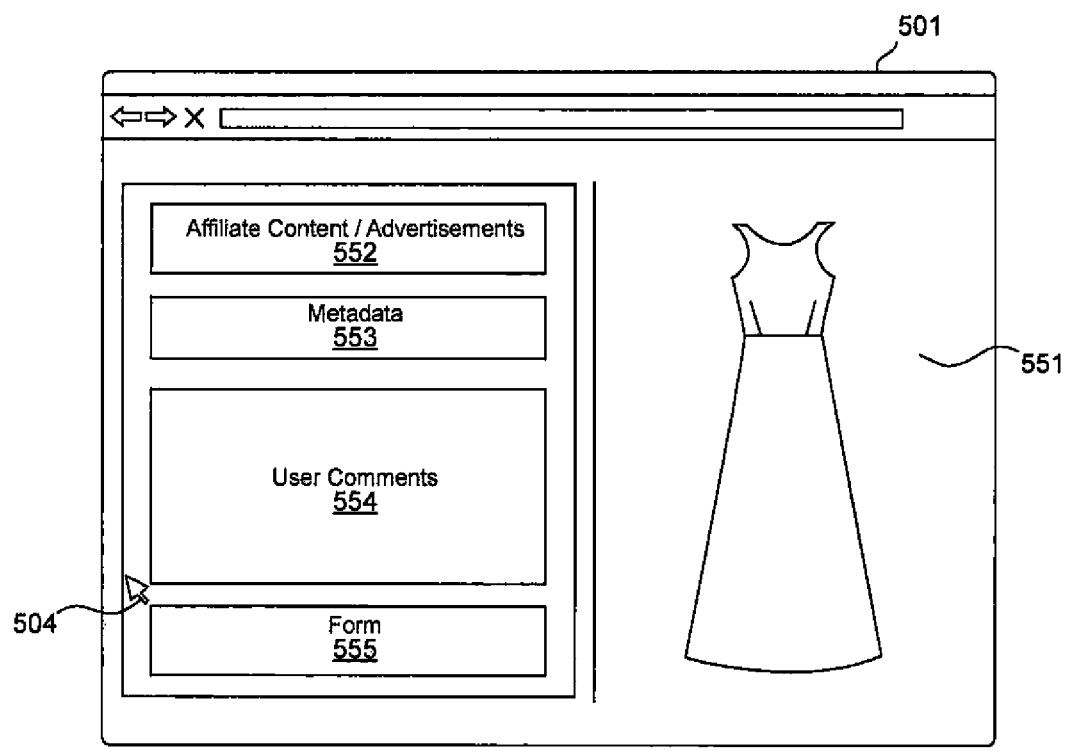
FIG. 5F illustrates another web page that includes annotations associated with the multimedia object corresponding to the visual indicator selected by the user, according to some embodiments.

In some embodiments, the client computer system receives a second user interface event indicating that the user selected a URL associated with the visual indicator. These embodiments are illustrated in FIGS. 5E and 5F. In FIG. 5E, the user has clicked on region 535 of the subset 531 of annotation data. In this example, region 535 is a clickable URL. In FIG. 5F, the client computer system requests a web page from the annotation server 110 for the URL selected by the user. The annotation server 110 retrieves the annotation data from a database (e.g., the database 322 in FIG. 3) of the annotation server 110, generates a web page based on the annotation data, and transmits the generated web page to the client computer system. The client computer system receives, processes, and displays the web page in the browser window 501. Alternatively, the web page may be displayed in a separate window or a separate layer that is overlaid on the web page. As illustrated in FIG. 5F, the web page may include one or more of: affiliate content/advertisements 552 associated with the visual indicator, metadata 553 (e.g., author information, creation dates, etc., associated with the visual indicator), user comments 554, and/or form 555 that allows users to add comments.

Figure 6A:
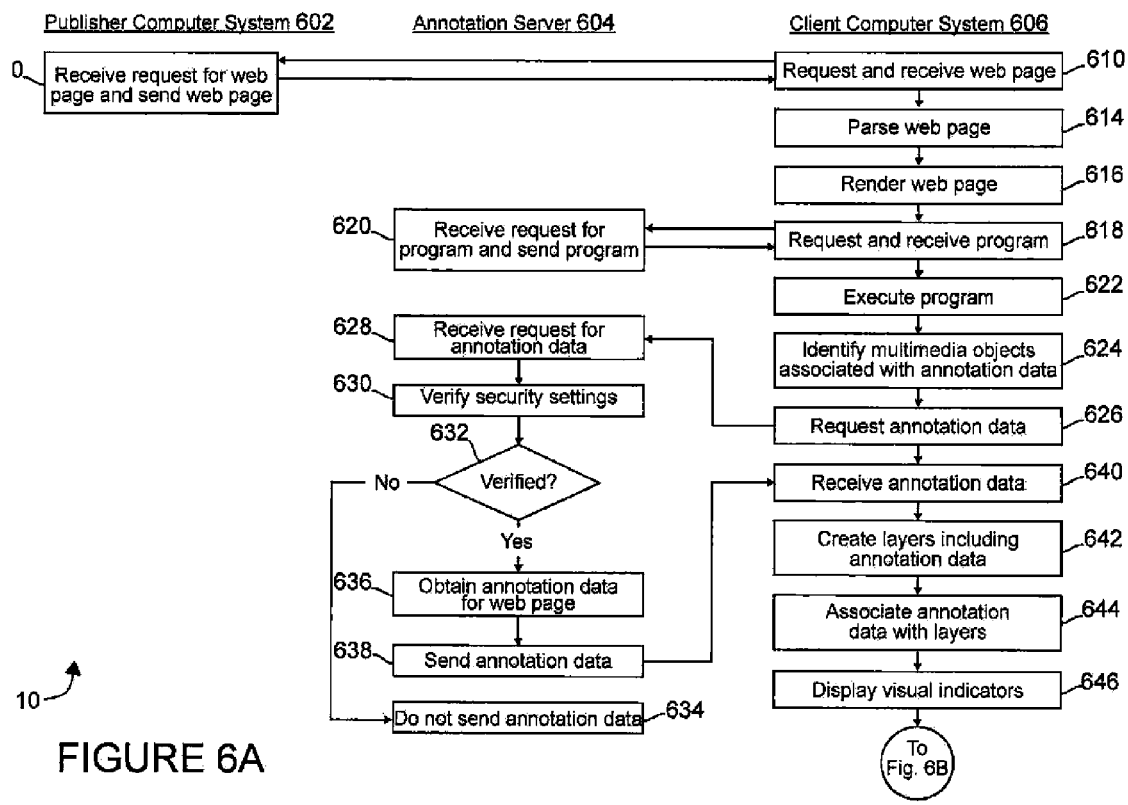
FIG. 6A is a flowchart of a method for displaying an annotation for a multimedia object on a web page, according to some embodiments.
Figure 6B:
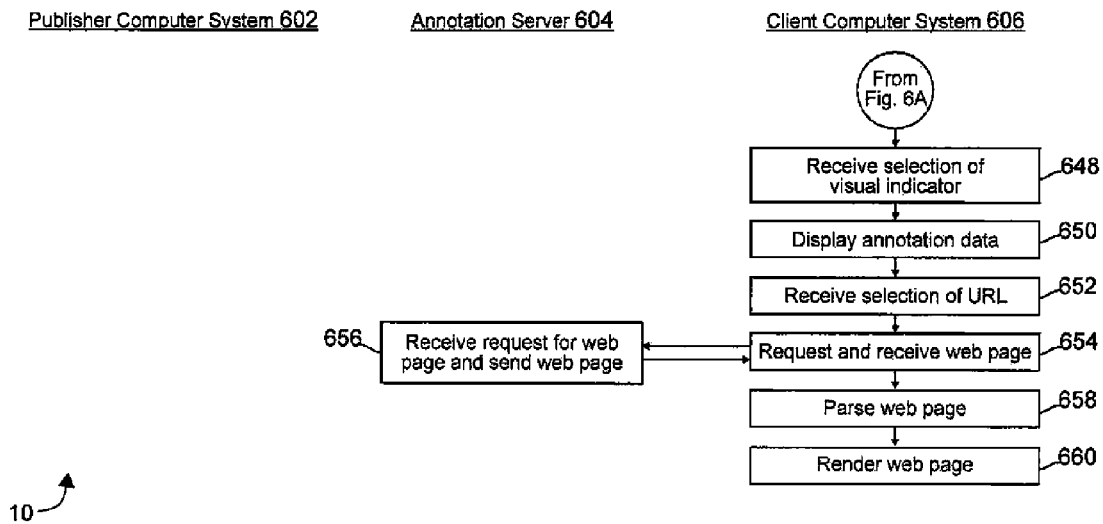
FIG. 6B is a continuation of the flowchart of FIG. 6A.

FIGS. 6A and 6B include a flowchart of a method 600 for displaying annotation data for a multimedia object on a web page, according to some embodiments. A publisher computer system 602 (e.g., any of the publisher computer systems 102 in FIG. 1), an annotation server 604 (e.g., the annotation server 110 in FIG. 1), and a client computer system 606 (e.g., any of the client computer systems 130 in FIG. 1) perform the operations illustrated in FIG. 6A in this example. In some embodiments, the publisher computer system 602, the annotation server 604, and the client computer system 606 are separate and distinct from each other. In some embodiments, the publisher computer system 602 and the annotation server 604 are located on the same system. The operations performed by the publisher computer system 602 may be performed by a web server module of the publisher computer system 602. The operations performed by the annotation server 604 may be performed by a web server module and/or an annotation module of the annotation server 604. The operations performed by the client computer system 606 may be performed by a web browser (or associated plug-ins such as a Java Virtual Machine, a JavaScript engine, etc.) of the client computer system 606.

The client computer system 606 receives (610) a request from a user for a web page hosted on the publisher computer system 602. In some embodiments, the web page includes a program (e.g., a Java or JavaScript program, etc.) and one or more multimedia objects, the one or more multimedia objects including a multimedia object associated with annotation data. In some embodiments, the program includes instructions to identify one or more multimedia objects in the web page that may be annotated and to interface with the annotation server 604, as described herein.

The publisher computer system 602 receives (612) the request for the web page, processes the request and sends (612) the web page to the client computer system 606. In some embodiments, the publisher computer system 602 sends the web page, associated multimedia objects, and/or programs.

The client computer system 606 then receives (610) the web page from the publisher computer system 602, parses (614), and renders (616) the web page in the web browser of the client computer system 606.

In some embodiments, the program is included with the source code for the web page. In some embodiments, the program is hosted on the annotation server 604. In these embodiments, the client computer system 606 requests (618) the program from the annotation server 604. The annotation server 604 receives (620) the request for the program and sends (620) the program to the client computer system 606. The client computer system 606 receives (618) the program.

The client computer system 606 then executes (622) the program. The client computer system 606 identifies (624) one or more multimedia objects associated with annotation data. In some embodiments, the client computer system 606 generates at least one layer, including a transparent layer, at least partially located over a respective multimedia object that is associated with annotation data. The client computer system 606 may first determine the size/dimensions of a multimedia object and create one or more layers based on the determined size. For example, if the multimedia object is an image, the client computer system 606 determines the size/dimension of the image and creates one or more layers that are the same (or smaller than) the determined size/dimensions of the image. In some embodiments, the one or more layers are defined by one or more HTML DIV layers. In these embodiments, a visibility parameter (e.g., a CSS visibility parameter) is used to make a respective DIV layer visible or invisible. Thus, a visual indicator may be rendered in a DIV layer, and by adjusting the visibility parameter for the DIV layer, the visual indicator may be visible or may be hidden in the web browser of the client computer system 606.

In some embodiments, the annotation data includes a file name of the multimedia object, the location within the multimedia object with which the respective annotation data is associated, text, a universal resource locator, any combination of the aforementioned items. In some embodiments, the location is a single coordinate (e.g., a pixel of the multimedia object) in a coordinate system that is defined relative to and that is within the dimensions of the multimedia object. The location may also include multiple coordinates (e.g., a specified area defined by a shape) in a coordinate system that is defined relative to and that is within the dimensions of the multimedia object. For example, the coordinate system may be defined relative to the length and width (e.g., in pixels) of the multimedia object when the multimedia object is displayed in a browser window of the user interface of the client computer system. The location may also include a bounded area defined by a set of points within the multimedia object.

The client computer system 606 then requests (626) the annotation data for multimedia objects associated with annotation data. The annotation server 604 receives (628) the request for annotation data, in some embodiments, the annotation server 604 verifies (630) security settings for the multimedia objects. For example, the annotation server 604 may verify that the publisher of the multimedia objects allows users to annotate the multimedia objects. If the security settings indicate that the multimedia objects may not be annotated (632, no), the annotation server 604 does not send (634) the annotation data. If the security settings indicate that the multimedia objects may be annotated (632, yes), the annotation server 604 obtains (636) from the database (e.g., the database 322 in FIG. 3) of the annotation server 604 the annotation data for the multimedia objects of the web page and sends (634) the annotation data to the client computer system 606.

The client computer system then receives (640) the annotation data from the annotation server 604. The client computer system 606 creates (642) one or more layers located on the multimedia object that are associated with annotation data, as described herein. The client computer system associates (644) the annotation data for the multimedia objects with the respective layers of the second multimedia object. For example, the client computer system 606 may assign annotation data associated with a respective location in a respective multimedia object to a respective layer in the one or more layers.

In some embodiments, the client computer system 606 determines locations within the multimedia objects that are associated with annotation data. In some embodiments, the client computer system 606 may render visual indicators in the one or more layers at the determined locations and set visibility parameters for the one or more layers so that the one or more layers (e.g., the visual indicators) are invisible. The client computer system 606 then displays (646) the visual indicators at the locations within the multimedia objects associated with annotation data in accordance with the annotation data, as described above (e.g., when the cursor is within a specified distance of the multimedia object that includes annotation data, etc.).

In some embodiments, the visual indicators include a visual indicator located at a specified pixel of the second multimedia object and/or a visual indicator including a specified area of the second multimedia object.

The client computer system 606 then receives (648) a user interface event (e.g., a mouse click) indicating that a visual indicator was selected by the user. The client computer system displays (650) at least a subset of the annotation data associated with the visual indicator in the web browser of the client computer system 606. In some embodiments, the subset of the annotation data includes a link to another web page (e.g., see FIG. 5F) hosted on the annotation server 604 including the annotation data associated with the visual indicator.

The client computer system 606 then receives (652) another user interface event (e.g., a mouse click) indicating that a link to another web page (e.g., see FIG. 5F) hosted on the annotation server was selected by the user. The client computer system 606 requests (654) the web page from the annotation server 604. The annotation server receives (656) the request for the web page and sends (656) the web page to the web browser of the client computer system 606. The client computer system 606 then receives (654) the web page from the annotation server 604, parses (658), and renders (660) the web page in the web browser of the client computer system 606.

Figure 11A:
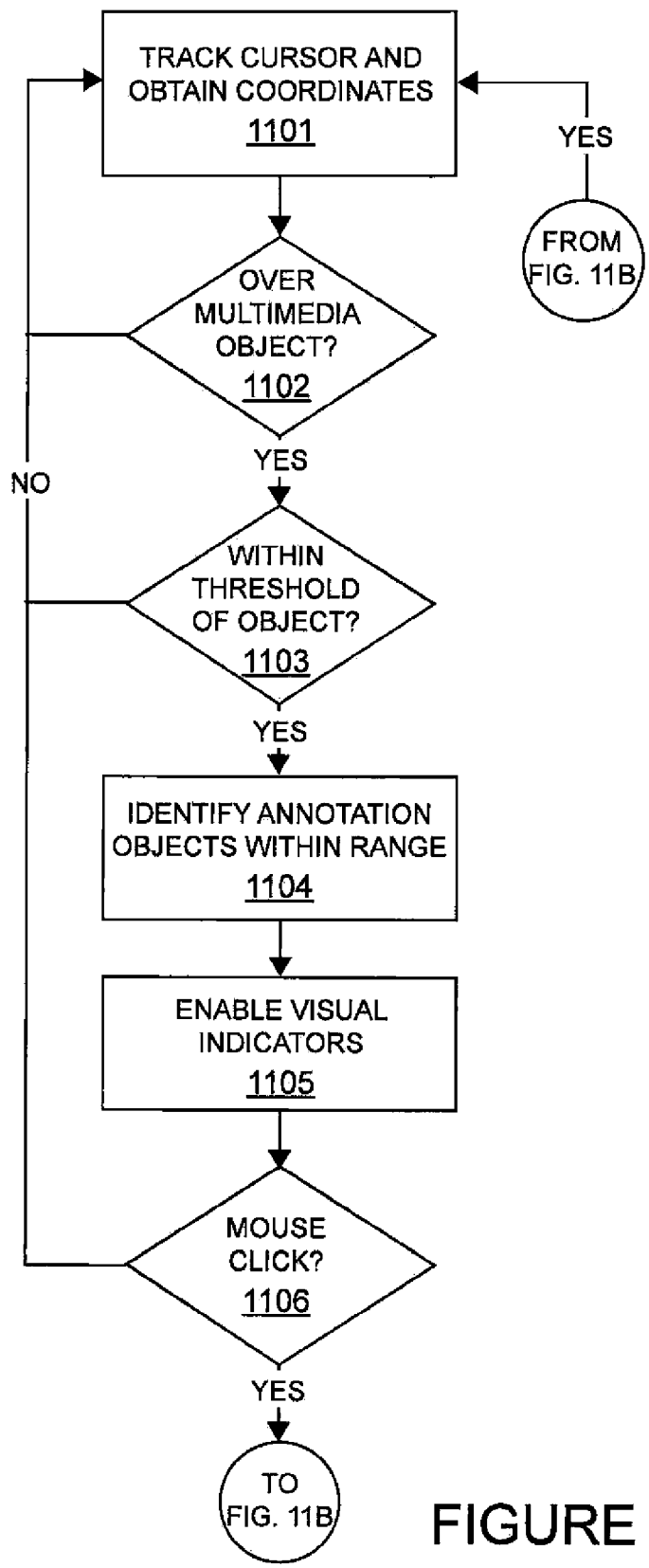
FIGS. 11A and 11B are flow diagrams illustrating an embodiment of cursor tracking in the system.
Figure 11B:
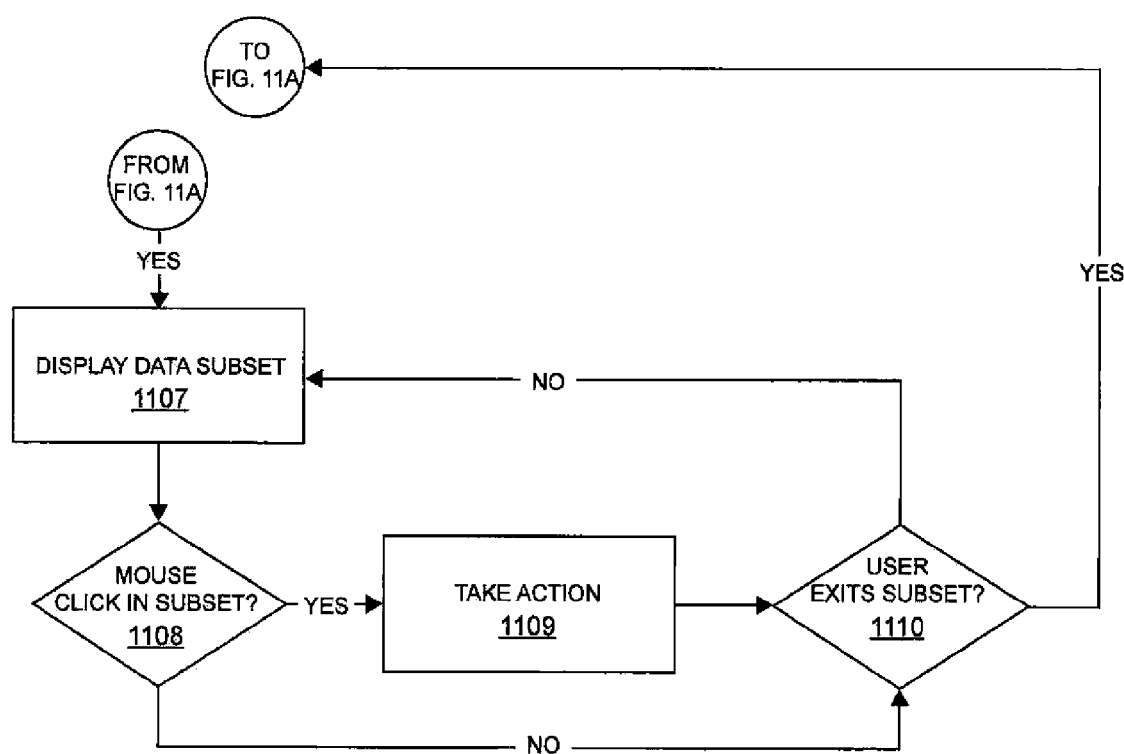

FIGS. 11A and 11B are flow diagrams illustrating cursor tracking and annotation object indicator display in an embodiment of the system. At step 1101, the system tracks the cursor on the display device and determines its coordinates.

At step 1102 the system determines if the cursor is over a multimedia object. If so, the system proceeds to step 1103. If not, the system returns to step 1101. If the cursor is over a multimedia object at step 1102, the system at decision block 1103 determines if the cursor coordinates are within a threshold range of one or more annotation objects. If not, the system returns to steps 1101. If so, the system proceeds to step 1104.

At step 1104, the system identifies those annotation objects that are within the threshold distance of the cursor. At step 1105 the system makes visible the visual indicators for those annotation objects. At step 1106 the system checks to see if the user has made a mouse click on any of the visible annotation objects. If not, the system returns to step 1101 to track the cursor. If so, the system proceeds to step 1107.

At step 1107 the system displays the data subset associated with the annotation object on which the user has clicked. The system also allows the user to move the cursor from the annotation object to the displayed data subset without hiding the current displayed annotation objects. At step 1108 the system checks for a mouse click in the data subset. If so, the system takes the appropriate action at step 1109. As note in connection with FIGS. 5A-51D, the action may be to open another web page in response to a URL being clicked, or any other appropriate action as indicated by the data subset.

If there is not click in the subset, or after the action has been taken at step 1109, the system checks to see if the user has exited the subset at step 1110. This may be by a mouse click somewhere outside the data subset, via a "close" button in the data subset, or by some other appropriate action. If the user has not exited the subset, the system returns to step 1107 and continues to display the subset. If the user has exited the data subset, the system returns to step 1101.

Creating Annotations

Figure 7A:
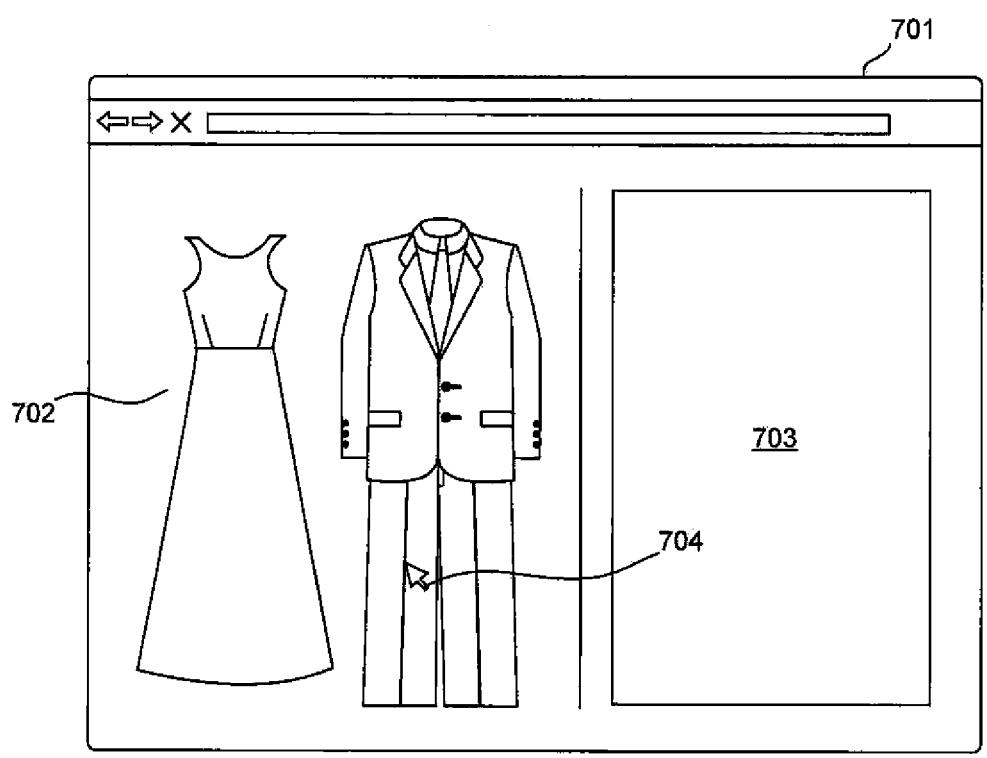
FIG. 7A illustrates a web page that includes a multimedia object, according to some embodiments.
Figure 7B:
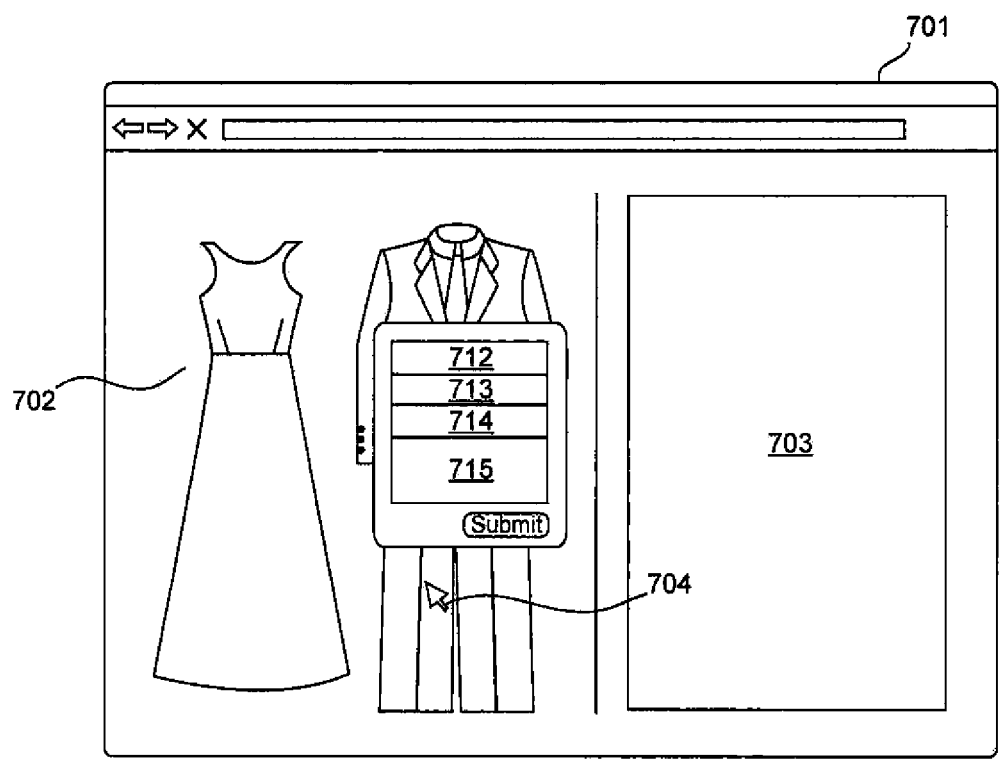
FIG. 7B illustrates the web page that includes a form for creating an annotation associated with the multimedia object, according to some embodiments.
Figure 7C:
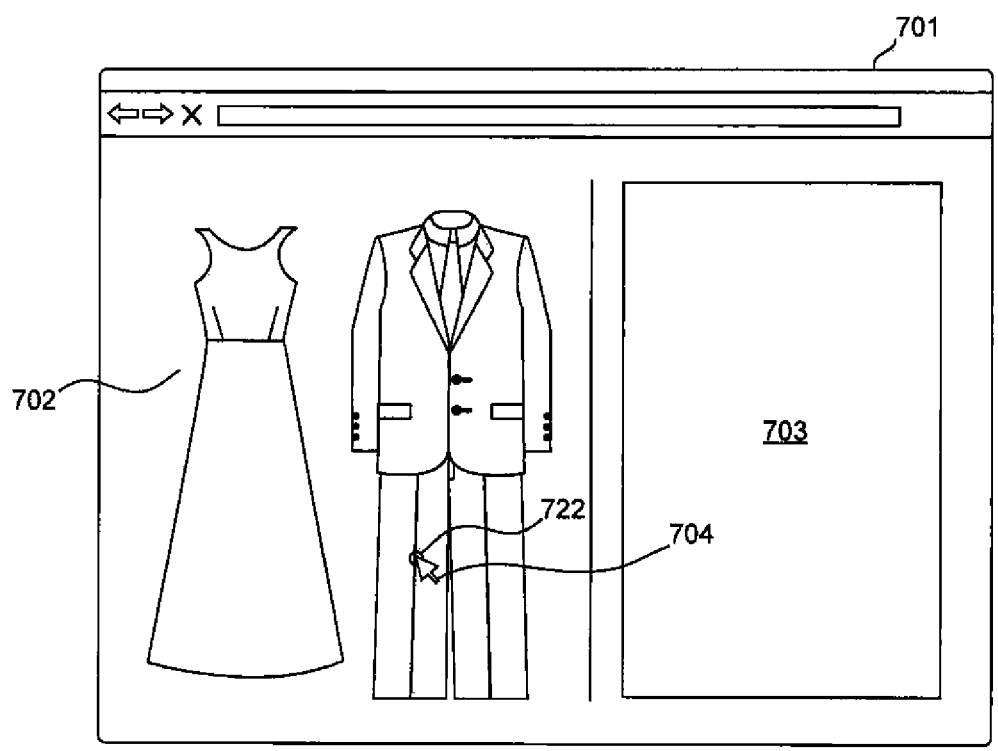
FIG. 7C illustrates the web page that includes a visual indicator for the annotation associated with the multimedia object, according to some embodiments.

FIGS. 7A-7C are a series of block diagrams illustrating a web page that includes a multimedia object 702 that is displayed in a browser window 701 in a user interface of a client computer system (e.g., the client computer system 130 in FIG. 1). The web page may also include content 703 (e.g., text, advertisements, etc.). A publisher of the web page (e.g., the publisher 105-1) has previously configured the multimedia object 702 so that users may annotate the multimedia object 702. For example, the publisher used an administration page an the annotation server (e.g., see FIG. 9) to indicate that the multimedia object 702 may be annotated by users.

In some embodiments, a web page that includes a multimedia object that may be annotated by users includes a program that a client computer system may execute to generate user interface objects that allow a user of the client computer system to annotate the multimedia object. For example, in FIG. 7A, the user moved a cursor 704 to a specified location in the multimedia object 702 and pressed a hotkey to activate the user interface object to annotate the multimedia object 702 at the specified location. Similarly, the user may first click on a user interface object (e.g., a button, etc.) and then click on the specified location in the multimedia object 702 to annotate the multimedia object 702 at the specified location.

In some embodiments, the client computer system generates one or more user interface objects that allow the user to annotate the multimedia object 702 at the specified location. For example, FIG. 7B illustrates the web page that includes a form for creating an annotation associated with the multimedia object, according to some embodiments. As illustrated in FIG. 7B, the user interface object may include a form that includes a number of fields 712-715 that the user may use to input annotation data. In addition to the user-supplied data, the annotation data may include one or more coordinates defining the specified location. The specified location may include a single coordinate in a coordinate system that is defined relative to, and that is within the dimensions of, the multimedia object. The specified location may also include multiple coordinates (e.g., a specified area defined by a shape) in a coordinate system that is defined relative to, and that is within the dimensions of, the multimedia object. For example, the coordinate system may be defined relative to the length and width (e.g., in pixels) of the multimedia object when the multimedia object is displayed in a browser window of the user interface of the client computer system.

In some embodiments, after submitting the annotation data to the annotation server, the client computer system displays a visual indicator at the specified location, indicating that the annotation data has been stored on the annotation server. For example, FIG. 7C illustrates a visual indicator 722 that is displayed by the client computer system after the annotation data was submitted to the annotation server.

In some embodiments, the specified location is a specified pixel of the multimedia object 702. In some embodiments, the specified location is a specified area of the multimedia object 702. For example, the specified area may be an area that is drawn by the user using the cursor 704.

Figure 8A:
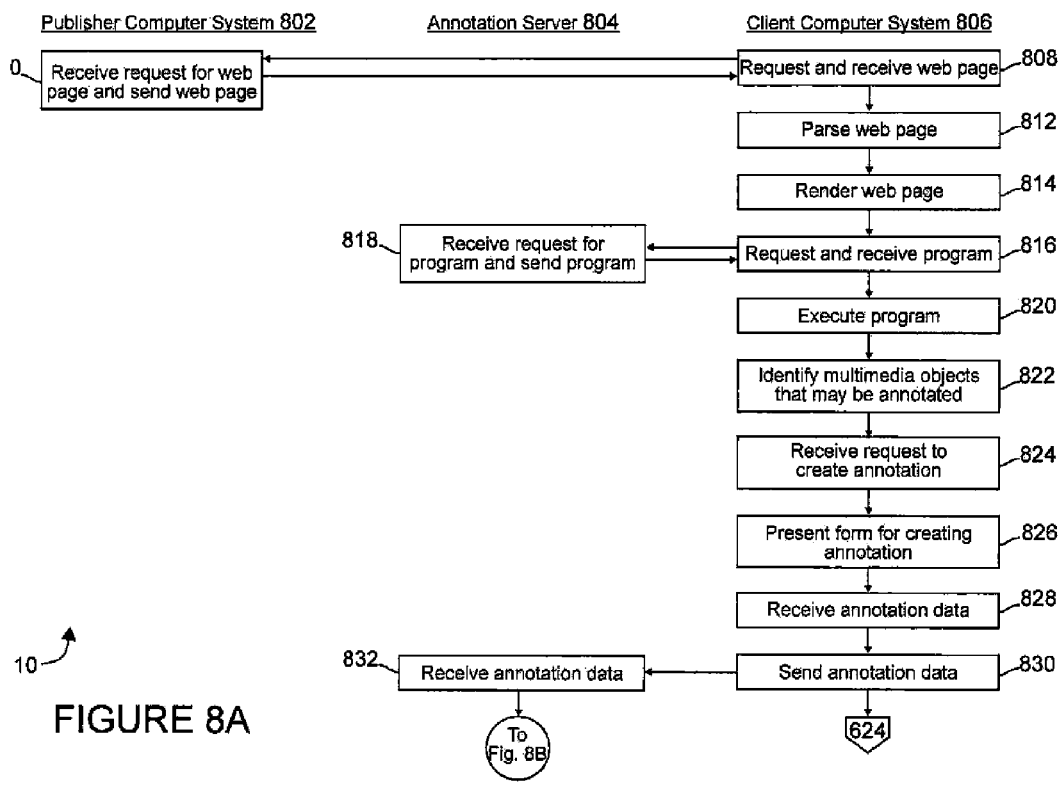
FIG. 8A is a flowchart of a method for displaying an annotation for a multimedia object on a web page, according to some embodiments.
Figure 8B:
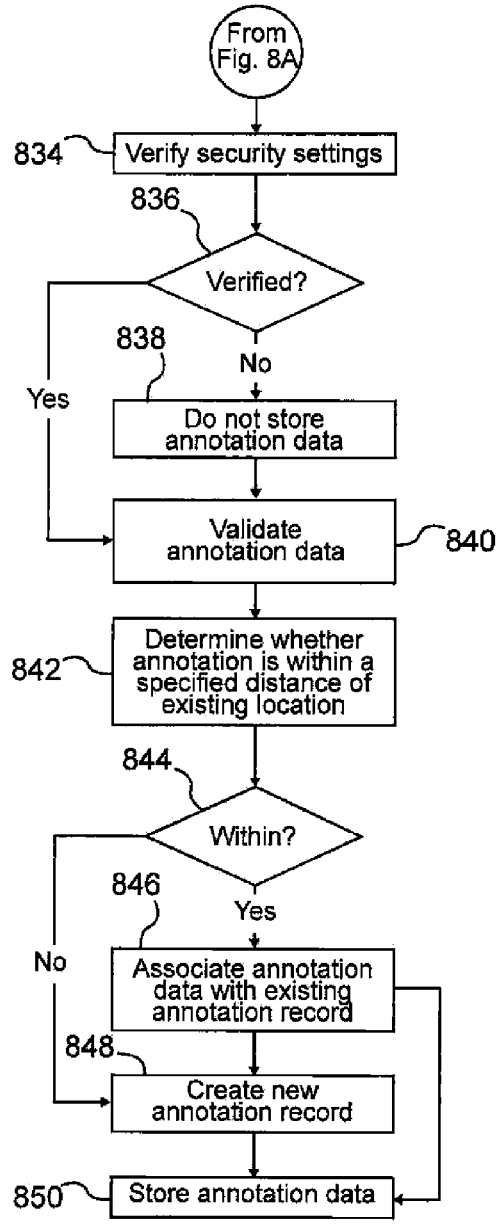
FIG. 8B is a continuation of the flowchart of FIG. 8A.

FIGS. 8A and 8B include a flowchart of a method 800 for creating an annotation for a multimedia object on a web page, according to some embodiments. A publisher computer system 802 (e.g., any of the publisher computer systems 102 in FIG. 1), an annotation server 804 (e.g., the annotation server 110 in FIG. 1), and a client computer system 806 (e.g., any of the client computer systems 130 in FIG. 1) perform the operations illustrated in FIG. 8. In some embodiments, the publisher computer system 802, the annotation server 804, and the client computer system 806 are separate and distinct from each other. In some embodiments, the publisher computer system 802 and the annotation server 804 are the same system. The operations performed by the publisher computer system 802 may be performed by a web server module of the publisher computer system 802. The operations performed by the annotation server 804 may be performed by a web server module and/or an annotation module of the annotation server 804. The operations performed by the client computer system 806 may be performed by a web browser (or associated plug-ins such as a Java Virtual Machine, a JavaScript engine, etc.) of the client computer system 806.

The client computer system 806 requests (808) a web page from the publisher computer system 802. In some embodiments the web page includes at least one multimedia object. In some embodiments, the web page and the at least one multimedia object are hosted on the publisher computer system 802. The publisher computer system 802 receives (810) the request and sends (810) the web page to the client computer system 806. The client computer system 806 receives (808) the web page from the publisher computer system 802.

The client computer system 806 parses (812) and renders (814) the web page in the web browser of the client computer system 806.

In some embodiments, the web page includes a program (e.g., a Java or JavaScript program, etc.) configured to create one or more layers, including a transparent layer, at least partially located over a multimedia object of a web page being displayed in the web browser of the client computer system 806, and wherein the one or more layers are used to facilitate the creation and display of annotation data for multimedia objects.

In some embodiments, the program is included with the source code for the web page. In some embodiments, the program is hosted on the annotation server 804. In these embodiments, the client computer system 806 requests (816) the program from the annotation server 804. The annotation server 804 receives (818) the request and sends (818) the program to the client computer system 806. The client computer system 806 receives (816) the program.

The client computer system 806 then executes (820) the program. The client computer system 806 identifies (822) multimedia objects in the web page that may be annotated. In some embodiments, the client computer system 806 generates one or more layers, including a transparent layer, at least partially located over the multimedia object displayed on the web page, wherein the one or more layers are configured to facilitate the creation and display of annotation data for the multimedia object based on user interface events produced by a user of the client computer system.

The client computer system 806 then receives (824) a request from the user to annotate a multimedia object of the web page. In some embodiments, the request includes a specified location within the multimedia object at which to associate the annotation data. In some embodiments, the specified location includes a specified pixel of the multimedia object and/or a specified area within the multimedia object. The client computer system 806 presents (826) a form for annotating the multimedia object in the web browser of the client computer system 806. The client computer system 806 receives (828) annotation data for the multimedia object from the user and transmits (830) the annotation data, including the specified location, to the annotation server 804 for storage. In some embodiments, the client computer system 806 transmits a request to the annotation server 804 to associate the annotation data with the multimedia object and to store the annotation data in a database of the annotation server 804, The annotation server 804 receives (832) the annotation data. In some embodiments, the annotation server receives the request to associate annotation data with the multimedia object and to store the annotation data in the database of the annotation server 804.

The annotation server 804 verifies (834) security settings for the multimedia object. If the security settings indicate that the multimedia object may not be annotated (836, no), the annotation server 804 does not store (838) the annotation data in the database of the annotation server 804. If the security settings indicate that the multimedia object may be annotated (836, yes), the annotation server 804 optionally validates (840) the annotation data. For example, the annotation server 804 may check the spelling, filter out unwanted words, etc.

The annotation server 804 then determines (842) whether the annotation data includes a location that is within a specified distance of an existing location included in an existing annotation record for the multimedia object in the database of the annotation server 804. In response to determining that the location is within the specified distance of an existing location included in an existing annotation record for the multimedia object (844, yes), the annotation server 804 associates (846) the annotation data with the existing annotation record in the database of the annotation server 804 stores (850) the annotation data in the database of the annotation server 804. In response to determining that the location is not within the specified distance of an existing location included in an existing annotation record for the multimedia object (844, no), the annotation server 804 creates (848) a new annotation record for the multimedia object in the database of the annotation server 804 stores (850) the annotation data in the database of the annotation server 804.

In some embodiments, after storing the annotation data in the database of the annotation server 804, the annotation server 804 transmits a confirmation that the annotation was stored in the database of the annotation server 804.

In some embodiments, the client computer system 806 then displays a visual indicator indicating that the annotation data is associated with the multimedia object (e.g., as described herein). If the client computer system 806 retained the annotation data in memory, the client computer system 806 may use the annotation data in memory to generate the visual indicators. If the client computer system 806 did not retain the annotation in memory, the computer system 806 returns to step 624 of FIG. 6 to retrieve and display the annotation data.

After annotation data for a multimedia object on a web page is stored in the database for the annotation server, the annotation may be viewed by other users. The other users may then add their own annotation data (e.g., comments, questions, etc.) to the existing annotation data for the multimedia object. The other users may also associate annotation data other multimedia objects on the same web page.

Figure 12:
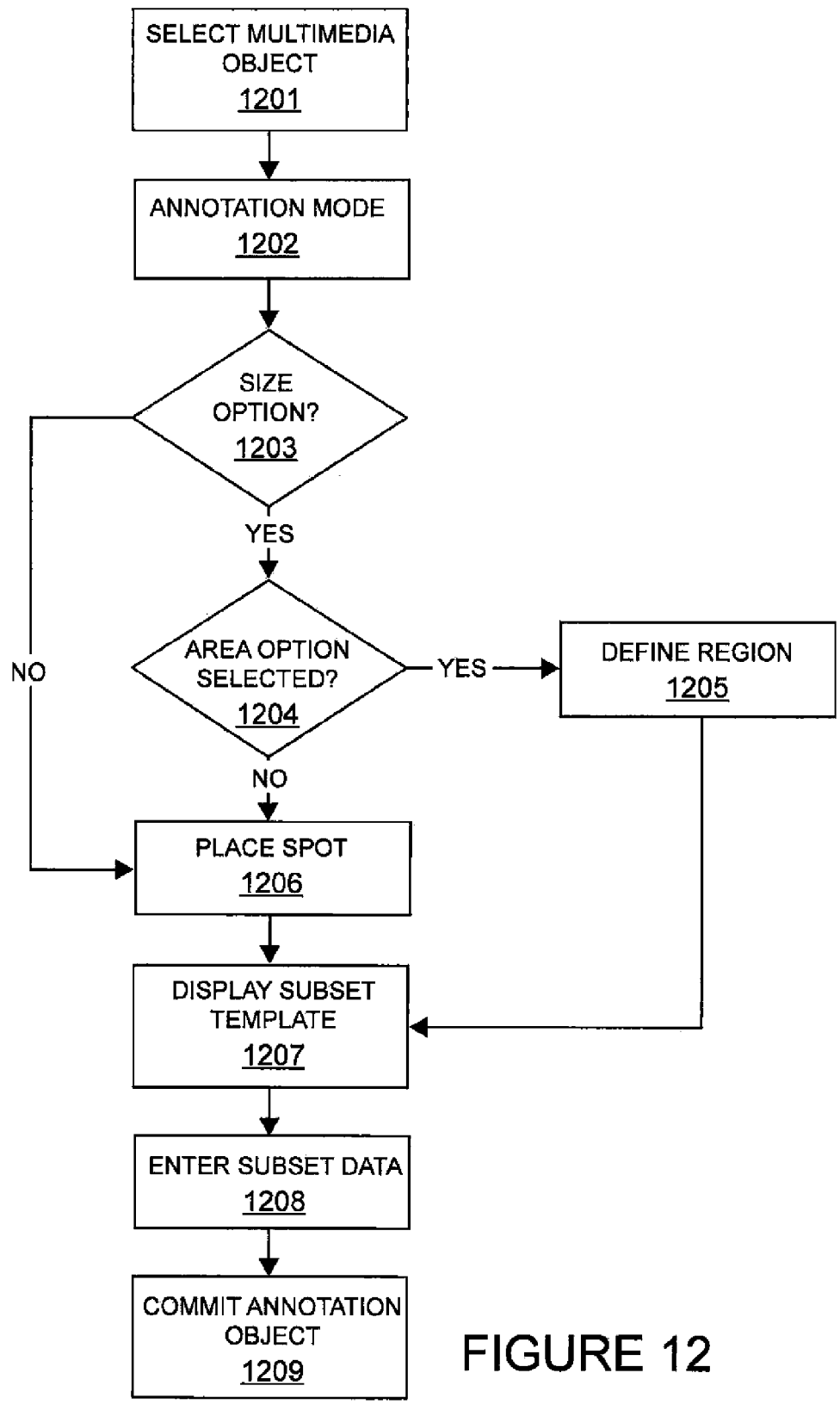
FIG. 12 is a flow diagram illustrating an embodiment of the annotation creating steps in FIG. 8.

FIG. 12 is a flow diagram illustrating the operation of the annotation creating steps of FIG. 8. At step 1201 the user selects the multimedia object to which the user wishes to add an annotation object. At step 1202 the user enters the annotation object creation mode. This may be via some action such as, for example, a right click on the mouse and a selection from a presented menu of options. Typically, the user might place the mouse in the general area of interest where the user wishes to add the annotation object when entering the annotation object creation mode.

At step 1203 it is determined if the user has the option of either a simple spot indicator or if the user may instead define an area or region as an annotation object. As noted above, the publisher may define certain parameters regarding the creation of annotation objects, including whether a user may define a region or area as an annotation object. If there is not area/region option enabled, the system proceeds to step 1206.

If there is an option to define both a spot or a region, the system proceeds to step 1204 to determine if the user has selected the area option. If so, the system moves to step 1205 where the user defines the region or area which will become the annotation object. In some embodiments, the system provides a polygon creation tool where the use can define anchor points with straight lines formed between to define an area on the multimedia object. In other embodiments, the user is presented with a drawing tool to enable the user to trace a border around a region to be defined as the annotation object. In other case, the multimedia object may have a number of graphics objects that can be selected and defined as annotation objects. For example, in FIG. 5B, the suit jacket 511 and the tie 512 were each defined as annotation objects. This could have been accomplished by the user tracing the outline of each item and defining it as an annotation object. In another embodiment, the suit jacket 511 and tie 512 were outlined by the user and defined as separate annotation objects.

If there is no option at step 1203, or if the user does not select the area option at step 1204, the system proceeds to step 1206 and the user places the spot visual indicator at the desired location on the multimedia object. After the annotation visual indicator is selected at step 1205 or step 1206, the system presents the subset data template to the user at step 1207. At step 1208 the enters subset data (see FIG. 5D for an example of the subset data format 531). The subset data can include text, links to URL's, image data, audio data, or other information as desired. The user can define a number of separate fields of subset data as desired.

At step 1209 the user completes the creation of the annotation object and the associated subset data and commits the annotation object. This may be by clicking on a "done" or "okay" button or by some other suitable means.

Figure 13A:
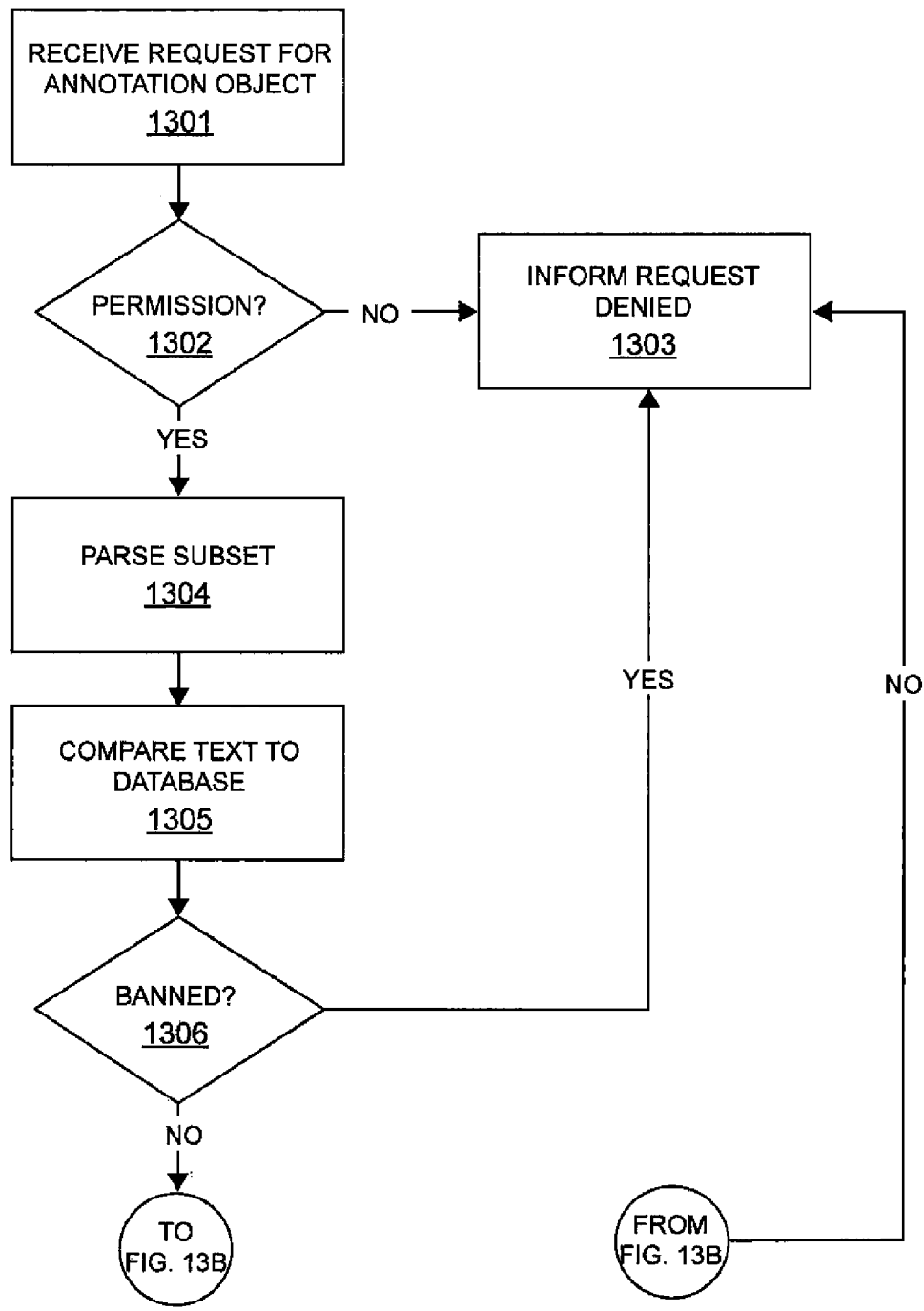
FIGS. 13A and 13B are flow diagrams of the validation steps of FIG. 8.
Figure 13B:
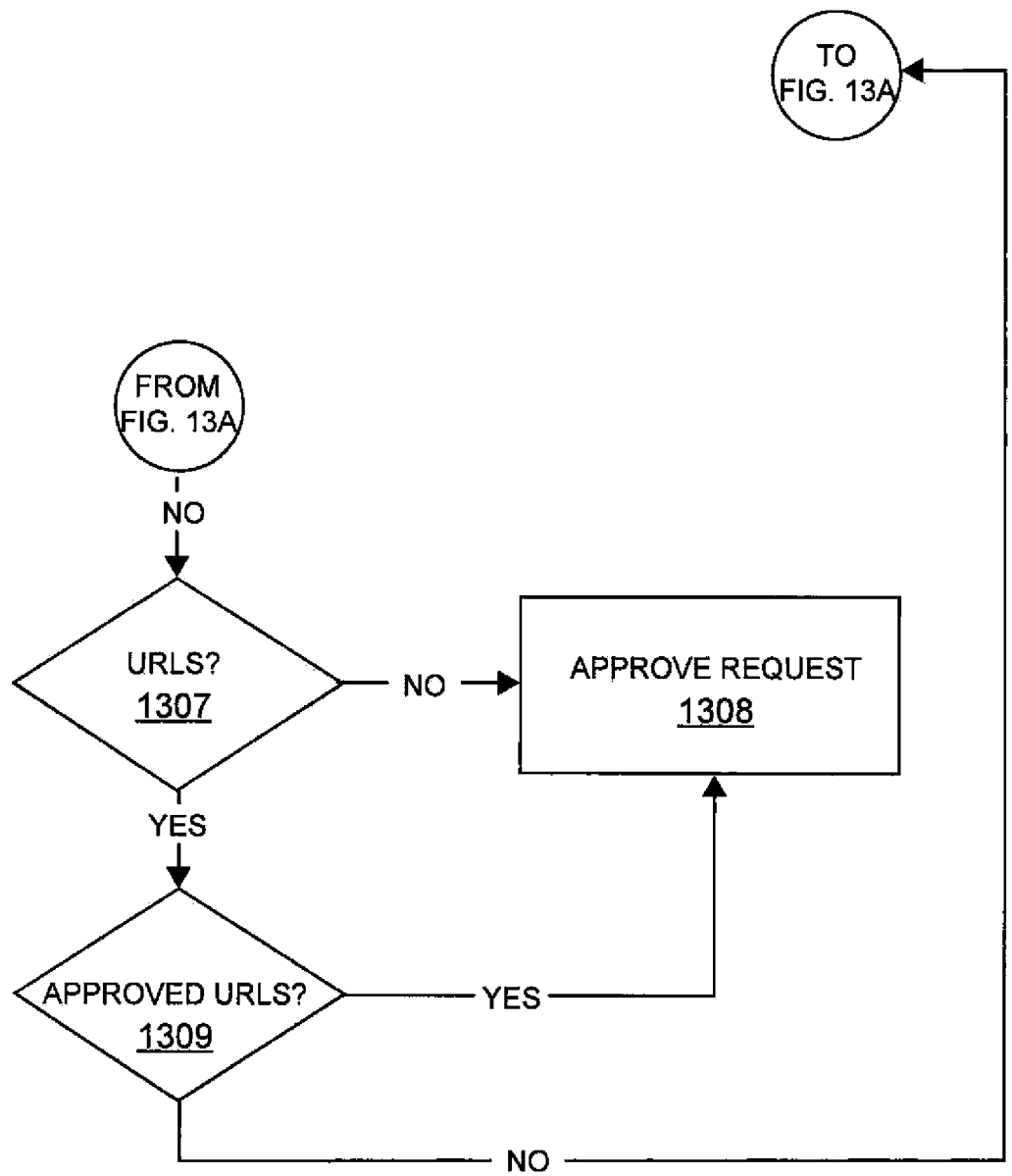

FIGS. 13A and 13B are flow diagrams illustrating the validation steps of FIG. 8. At step 1301 the system receives a request for adding an annotation object to a multimedia object. As described in connection with FIGS. 7A-7C and FIGS. 8A and 8B, the creation of the annotation object can take place in some embodiments on a client computer and the validation can take place in some embodiments on a annotation server. At step 1302 the annotation server initially determines if the user is allowed to add an annotation object. If not, the system returns a message to the user at step 1303 to inform the user that the request for the annotation object is denied.

If so, the system proceeds to step 1304 and parses the subset data of the annotation object and identifies the text and links (if any) associated with the requested annotation object. At step 1305 the system compares the parsed text to a database of unacceptable terms defined by the publisher. At step 1306 the system determines if any banned words are present. If so, the system moves to step 1303 and informs, the requestor that the annotation object is not approved. If not, the system proceeds to step 1307.

At step 1307, the system checks for the presence of URL's in the subset of data. If there are no URL's, the system approves the request for annotation at step 1308. If there are one or more URL's, the system then compares the URL's against a database of URL's for approval at step 1309. The publisher may not want the multimedia object linked to certain web sites and may have a list of either unapproved or approved web site links for the particular multimedia object. If the URL's are approved, then the system proceeds to step 1308 and the annotation object request is approved. If the URL's are not approved, the system proceeds to step 1303 and informs the requestor that the annotation object is not approved.

In some embodiments, annotation points may be edited by other users. For example, the subset of data that is displayed when an annotation point is activated may include text fields that allow users to enter textual descriptions. In other embodiments, a user edits the subset of data by adding more fields to those already existing.

In some embodiments, when a user activates a URL associated with an annotation point, the system provides a link to a page such as shown in FIG. 5F. One field, such as field 554, is a comment field where uses can enter comments about the linked item. In some embodiments, each comment is treated as a separate entry, and subsequent users can give a positive or negative rating to each comment. The system allows for the ranking of comments by highest or lowest ranked entries. In some embodiments, if a comment has 15 positive rating and 1 negative rating, the comment has a net rating of +14. In some embodiments, the comments can be ranked by most or least ratings.

One of the advantages of the system is that the annotation objects of the multimedia object will travel with the multimedia object wherever it is posted. This differs from prior art systems where annotations can only appear on a particular website and disappear when the multimedia object is copied or moved to other web sites. In the present system, the annotation objects will remain with the multimedia object in each site where it is posted.

Facial Recognition

The system provides a facial recognition system that operates in the user's browser. The system can analyze a photograph and identify the locations of any faces in the photograph. In some embodiments, the system can identify the emotional state of each identified face. In some embodiments, the system can determine if an identified face is found in any other photographs in an image database.

In some embodiments, the system provides a demand-side environment to enable vendors of goods and services to gauge interest in a particular good or service. When adding an annotation object, or when viewing an annotation object, the system provides a "like" button, a "willing to buy" button, or something similar by which the user can indicate a heightened interest in a commercially available product. This allows the supplier of the same or similar product to offer group sales or discounts to those users. For example, if several hundred uses have expressed interest in a particular type of clothing, such as jeans. This data may have been collected by users looking at different or the same images. The system can provide that information to a producer of jeans, who can then initiate a special offer to those users who have expressed interest in jeans.

Figure 14:
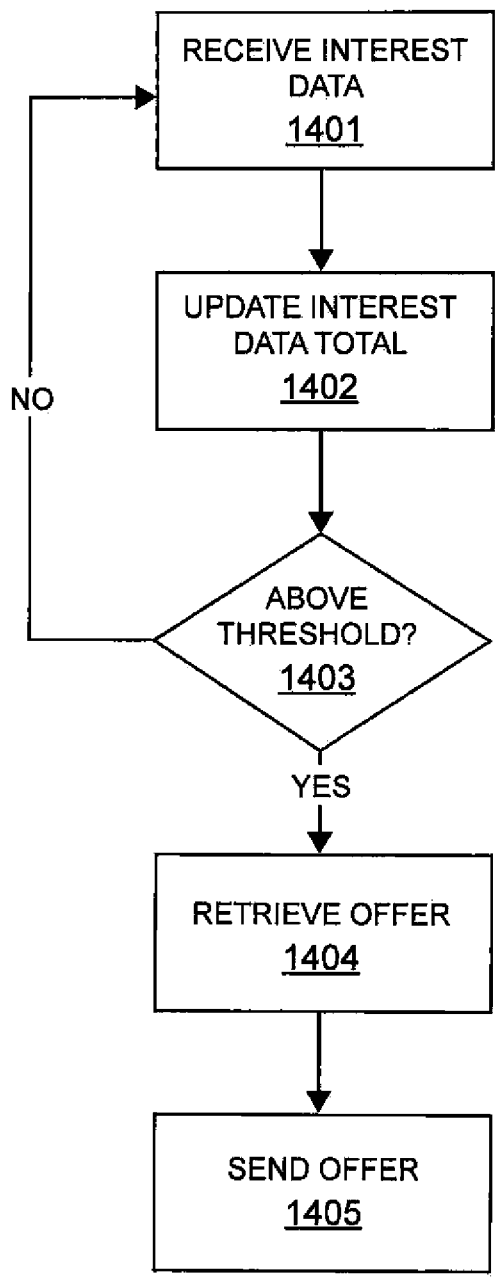
FIG. 14 is a flow diagram of an embodiment of the system.

The operation of demand-side offers is illustrated in the flow diagram of FIG. 14. At step 1401 the system receives interest data from the population of annotation objects. Each item for which there is interest data is associated with certain metadata terms so that the interest comments can be sorted and assigned to entries in a histogram to track interest in each metadata term. At step 1402 the system updates the interest database based on the interest data received at step 1401.

At decision block 1403 the system determines, for each metadata term, whether the number of users who have indicated interest in an item is above a desired threshold. The interest data may be cumulative or it may be over a particular time period, such as a day or a week. The threshold number can be fixed or may be dynamic based on any number of factors. If the interest data is below the threshold level, the system returns to step 1401 and receives additional data.

If the interest data is above the threshold for a particular metadata term, the system retrieves an offer at step 1404 that is associated with that term. Using the example above, if the term is jeans, the system would retrieve an offer from a jeans vendor who wishes to provide an offer for jeans if the interest data is above a certain threshold. At step 1405 the offer is sent. The offer may be sent only to those users who expressed an interest in the item or it may be sent to all users as desired.

In some embodiments, the system can sell the user list of those indicating interest to the vendor according to terms agreed to by the vendor and the system. In other instances, the vendor agrees to pay a fee for each user that visits the vendor site via an annotation object link.

In another embodiment, the system links a user of the system with social networking sites of the user. The system can add an entry on the home page of the user of all annotation object creation and use by the user. The system can also track all annotation objects for which the user has indicated an interest.

Administration

FIG. 9 is a block diagram 900 of an account administration web page displayed in a browser window 901, according to some embodiments. The account administration web page may be used by a publisher to manage security settings for the publisher's account on an annotation server. The account administration web page includes a number of configuration options for a publisher's account on the annotation server. The account administration page may include user interface object 902 that allow a publisher to manage permissions. For example, the publisher may designate what types of users (e.g., all users, registered users, designated users, etc.) may annotate multimedia objects hosted on the publisher's website. The publisher may also designate users and roles. For example, user 910 is designated as an administrator (e.g., an account administrator) and users 911-912 are designated as users that may annotate multimedia object (e.g., when the "Designated Users" option is selected). The account administration page may include user interface object 904 mat allow the publisher to manage multimedia objects that may be annotated. For example, the publisher has allowed multimedia objects with the URLs 920-924 to be annotated.

The administration web page also displays unique identifiers (e.g., tokens 930-934) that correspond to the URLs and a link 950 (e.g., a URL) to the program that performs the client-side annotation operations described herein. Alternatively, the administration web page may display HTML code including the link to the program. In doing so, the publisher may cut and paste the HTML code into the HTML source file for web pages that include multimedia objects that may be annotated.

In some embodiments, the publisher may specify that multimedia objects located within a specified path may be annotated. For example, the publisher may specify that multimedia objects in a specified domain (or sub-domain) may be annotated. Similarly, the publisher may specify that multimedia objects below a specified path (e.g., all multimedia objects that are in the path http://www.example.com/path1/ and that are in sub-directories of the path) may be annotated.

The administration web page may also include a user interface object 906 that allows the publisher to specify which third-party websites may link-to multimedia objects and use annotation data for the multimedia objects of the publisher. For example, the publisher specified that sites 940-941 may link to and use annotation data for the multimedia objects of the publisher.

Figure 10A:
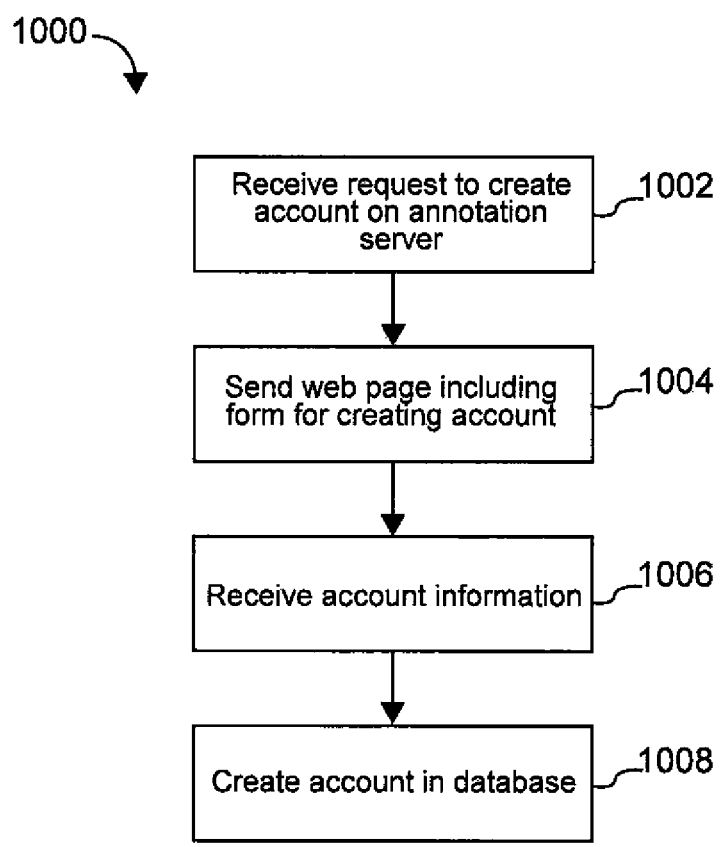
FIG. 10A is a flowchart of a method for creating an account on an annotation server, according to some embodiments.

FIG. 10A is a flowchart of a method 1000 for creating an account on an annotation server, according to some embodiments. The annotation server receives (1002) a request to create an account on the annotation server. For example, a publisher may request an account on the annotation server. The annotation server sends (1004) a web page including a form for creating an account on the annotation server. The annotation server then receives (1006) the account information (e.g., via the form submission) and creates (1008) the account in a database of the annotation server.

Figure 10B:
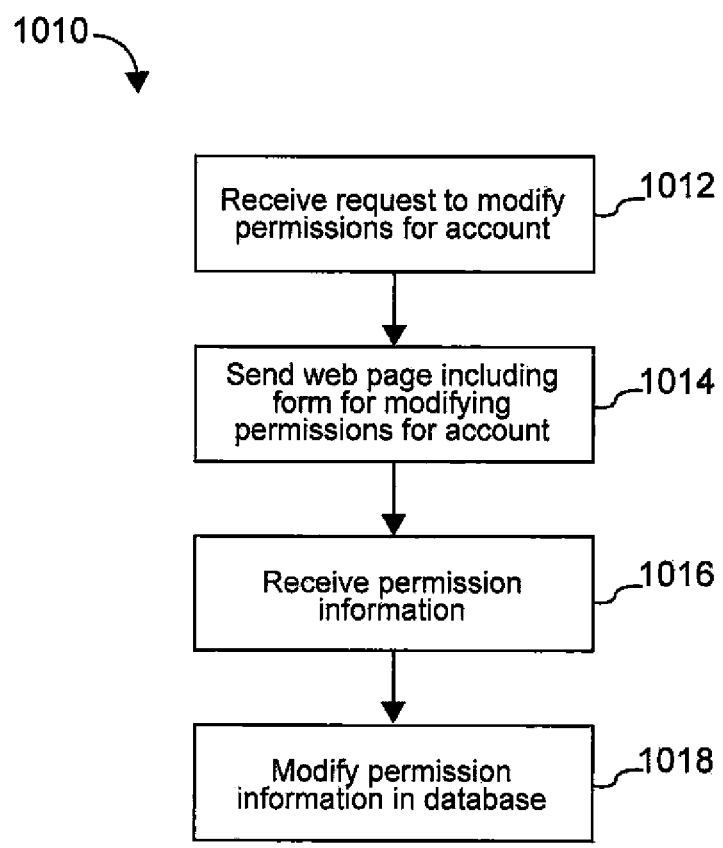
FIG. 10B is a flowchart of a method for modifying permissions of an account, according to some embodiments.

FIG. 10B is a flowchart of a method 1010 for modifying permissions of an account, according to some embodiments. The annotation server receives (1012) a request to modify permissions for an account. For example, the annotation server may receive a request to add or delete account administrators for an account of the publisher. The annotation server then sends (1014) a web page including a form for modifying permissions for the account. The annotation server receives (1016) the permission information (e.g., via the form submission) and modifies (1018) the permissions information for the account in the database for the annotation server.

Figure 10C:
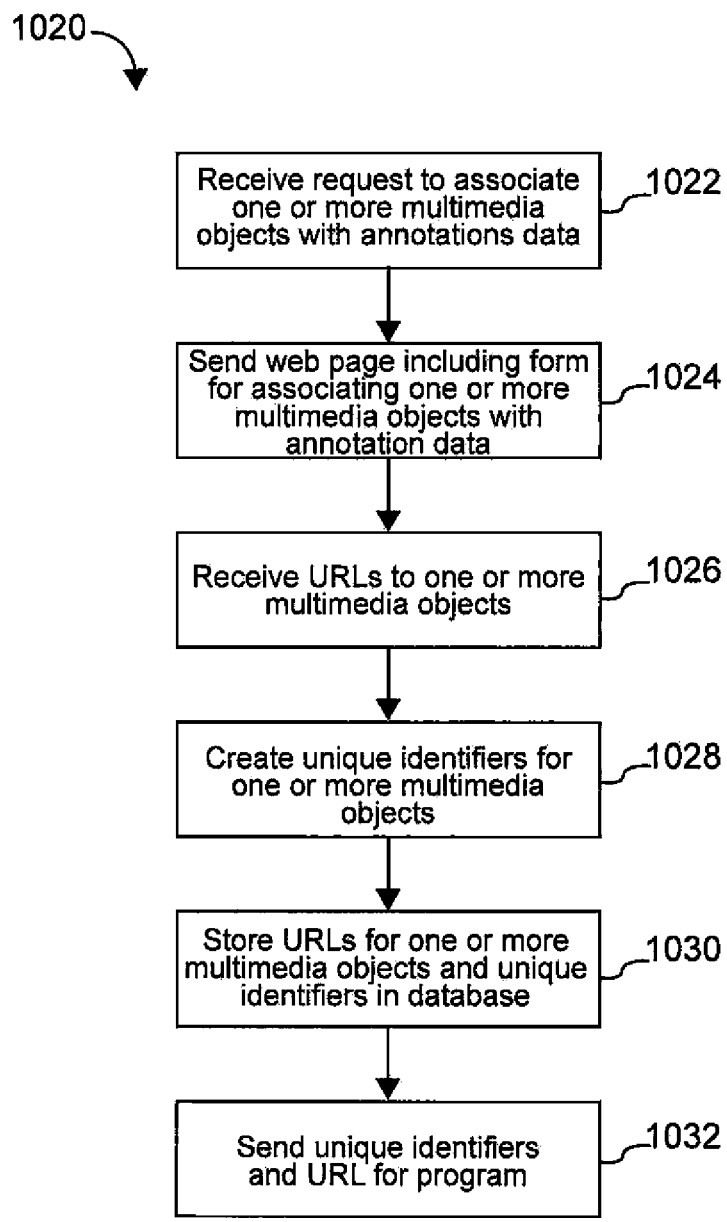
FIG. 10C is a flowchart of a method for configuring a multimedia object so that it may be annotated by users, according to some embodiments.

FIG. 10C is a flowchart of a method 1020 for configuring one or more multimedia object so that it may be annotated by users, according to some embodiments. The annotation server receives (1022) a request to associate one or more multimedia objects with annotation data. In some embodiments, the request includes a corresponding link for the one or more multimedia objects (e.g., URLs to the one or more multimedia objects). The annotation server then sends (1024) a web page including a form for associating one or more multimedia objects with annotation data. The annotation server receives (1026) URLs to one or more multimedia objects (e.g., via the form submission). The annotation server then creates (1028) unique identifiers (e.g., tokens) for the one or more multimedia objects and stores (1030) the corresponding links for one or more multimedia objects and the unique identifiers in the database of the annotation server. The annotation server then sends (1032) to the web browser of the client computer system the unique identifier and a link for the program. The publisher may then insert the unique identifiers and/or link for the program into web pages that include multimedia objects that may be annotated.

Figure 10D:
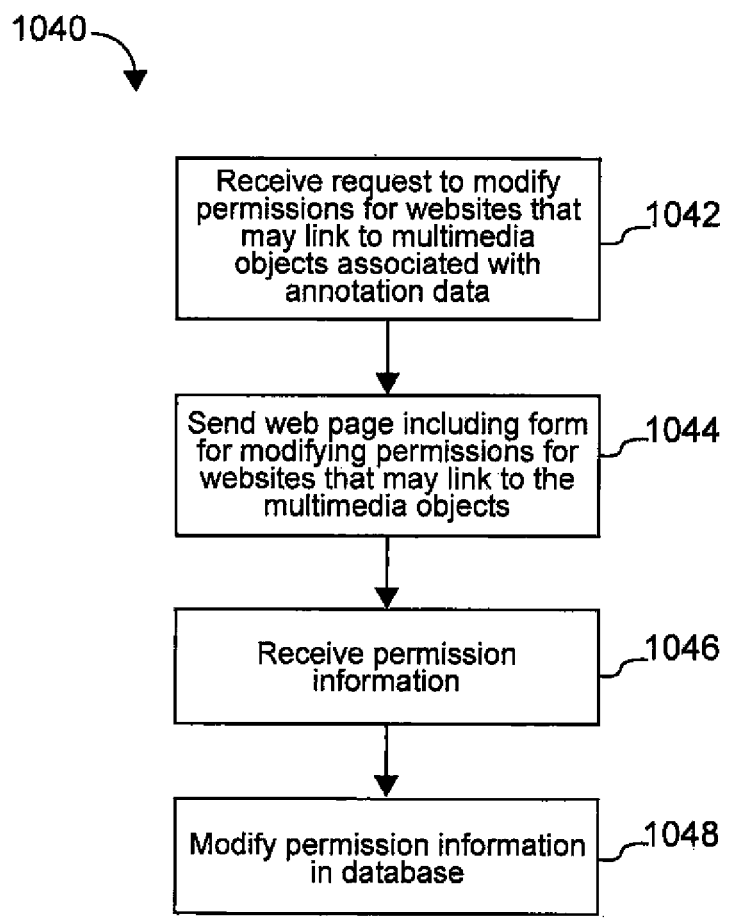
FIG. 10D is a flowchart of a method for configuring a multimedia object so that third-party website may link to the multimedia object, according to some embodiments.

FIG. 10D is a flowchart of a method 1040 for configuring a multimedia object so that third-party website may link to the multimedia object, according to some embodiments. The annotation server receives (1042) a request to modify permission for websites that may link to multimedia objects associated with annotation data. For example, a publisher may allow an affiliate website permission to link to and to use the annotation data associated with one or more multimedia objects hosted on the publisher's computer system. The annotation server sends (1044) a web page including a form for modifying permissions for websites that may link to the multimedia objects. The annotation server then receives (1046) permission information (e.g., via the form submission) and modifies (1048) the permission information in the database of the annotation server.

The methods 600, 800, 1000, 1010, 1020, and 1040 may be governed by instructions that are stored in a computer readable storage medium and that are executed by one or more processors of a respective system (e.g., the CPUs 202, 302, and/or 402 FIGS. 2, 3, and 4, respectively). Each of the operations shown in FIGS. 6, 8, and 10A-10D may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for annotating, on a client computer system, a multimedia object, the method comprising:
   providing the multimedia object to the client computer system, the client computer system adapted to render a web page that includes the multimedia object;
   providing an annotation program to the client computer system, the annotation program configured to enable the creation and display of annotation data for the multimedia object at the client computer system, wherein the annotation program is adapted to execute on the client computer system to:
  generate one or more layers, including a transparent layer, at least partially located over the multimedia object displayed on the rendered web page, wherein the one or more layers are configured to facilitate the creation and display of annotation data for the multimedia object based on user interface events produced by a user of the client computer system;
  receive annotation data for the multimedia object from the user, the annotation data indicating a specific location within the multimedia object with which the annotation data is associated; and
  transmit the annotation data to an annotation server for storage;
receiving the annotation data at the annotation server;
determining if the specific location is within a specified spatial distance of a second location within the multimedia object indicated in an existing annotation record for the multimedia object in a database of the annotation server;
responsive to determining that the specific location is within the specified spatial distance of the second location indicated in the existing annotation record for the multimedia object, associating the annotation data with the existing annotation record in the database of the annotation server;
responsive to determining that the specific location is not within the specified spatial distance of the second location indicated in the existing annotation record for the multimedia object, creating a new annotation record for the multimedia object in the database of the annotation server; and
storing the annotation data in the database of the annotation server.

2. The computer-implemented method of claim 1, wherein the annotation program is hosted on the annotation server.

3. The computer-implemented method of claim 1, wherein the annotation program is included with source code for the web page.

4. The computer-implemented method of claim 1, wherein the annotation program is further adapted to:
  present a form for annotating the multimedia object in a web browser of the client computer system.

5. The computer-implemented method of claim 1, wherein the specific location is selected from the group consisting of:
  a specified pixel of the multimedia object; and
  a specified area within the multimedia object.

6. The computer-implemented method of claim 1, wherein the annotation data includes one or more data types selected from the group consisting of:
  a file name of the multimedia object;
  text; and
  a universal resource locator.

7. The computer-implemented method of claim 1, wherein the multimedia object consists of one or more of: an image; a video clip; an audio clip; and text.

8. The computer-implemented method of claim 1, wherein a second user of a second client computer system can view and add additional annotation data to the annotation data added by the user.

9. The computer-implemented method of claim 1, wherein prior to storing the annotation data in the database of the annotation server, the computer-implemented method further comprises:
  verifying security settings for the multimedia object; and
  storing the annotation data in the database of the annotation server only if the security settings indicate that the multimedia object may be annotated.

10. The computer-implemented method of claim 1, wherein providing an annotation program to the client computer system further comprises:
  determining if the user has permission to annotate the multimedia object; and
  responsive to determining that the user has permission to annotate the multimedia object, providing the annotation program to the client computer system.

11. The computer-implemented method of claim 1, further comprising:
  receiving a request for the annotation data from a second client computer system; and
  responsive to receiving the request for the annotation data from a second client computer system, sending the annotation data to the second client computer system.

12. The computer-implemented method of claim 1, wherein receiving the annotation data comprises:
  receiving a request to place an annotation object on the multimedia object, the request to place the annotation object defining a specified area within the multimedia object as the annotation object; and
  receiving subset data associated with the annotation object, the subset data comprising textual data;
  wherein storing the annotation data in the database comprises storing the annotation object and the subset data.

13. The computer-implemented method of claim 12, further comprising:
  validating the textual data to determine whether the textual data includes unacceptable data; and
  denying the request to place the annotation object on the multimedia object responsive to the textual data including unacceptable data.

14. A server computer system, comprising:
one or more processors;
memory; and
one or more programs stored in the memory, the programs configured to enable the annotation of a multimedia object on a client computer system, the one or more programs comprising instructions to:
  provide the multimedia object to the client computer system, the client computer system adapted to render a web page that includes the multimedia object;
  provide an annotation program to the client computer system, the annotation program configured to enable the creation and display of annotation data for the multimedia object at the client computer system, wherein the annotation program is adapted to execute on the client computer system to:
    generate one or more layers, including a transparent layer, at least partially located over the multimedia object displayed on the rendered web page, wherein the one or more layers are configured to facilitate the creation and display of annotation data for the multimedia object based on user interface events produced by a user of the client computer system;
    receive annotation data for the multimedia object from the user, the annotation data indicating a specific location within the multimedia object with which the annotation data is associated; and
    transmit the annotation data to an annotation server for storage;

receive the annotation data at the annotation server;
determine if the specific location is within a specified spatial distance of a second location within the multimedia object indicated in an existing annotation record for the multimedia object in a database of the annotation server;
in response to determining that the specific location is within the specified spatial distance of the second location indicated in the existing annotation record for the multimedia object, associate the annotation data with the existing annotation record in the database of the annotation server;
in response to determining that the specific location is not within the specific spatial distance of the second location indicated in the existing annotation record for the multimedia object, create a new annotation record for the multimedia object in the database of the annotation server; and
store the annotation data in the database of the annotation server.

15. The server computer system of claim 14, wherein the annotation data includes one or more selected from the group consisting of:
a file name of the multimedia object;
text; and
a universal resource locator.

16. The server computer system of claim 14, wherein the multimedia object is selected from the group consisting of:
an image;
a video clip;
an audio clip; and
text.

17. A computer readable storage medium storing one or more programs configured for execution by a computer, the programs configured to enable the annotation of a multimedia object on a client computer system, the one or more programs comprising instructions to:
provide the multimedia object to the client computer system, the client computer system adapted to render a web page that includes the multimedia object;
provide an annotation program to the client computer system, the annotation program configured to enable the creation and display of annotation data for the multimedia object at the client computer system, wherein the annotation program is adapted to execute on the client computer system to:
generate one or more layers, including a transparent layer, at least partially located over the multimedia object displayed on the rendered web page, wherein the one or more layers are configured to facilitate the creation and display of annotation data for the multimedia object based on user interface events produced by a user of the client computer system;
receive annotation data for the multimedia object from the user, the annotation data indicating a specific location within the multimedia object with which the annotation data is associated; and
transmit the annotation data to an annotation server for storage;
receive the annotation data at the annotation server;
determine if the specific location is within a specified spatial distance of a second location within the multimedia object indicated in an existing annotation record for the multimedia object in a database of the annotation server;
in response to determining that the specific location is within the specified spatial distance of the second location indicated in the existing annotation record for the multimedia object, associate the annotation data with the existing annotation record in the database of the annotation server;
in response to determining that the specific location is not within the specific spatial distance of the second location indicated in the existing annotation record for the multimedia object, create a new annotation record for the multimedia object in the database of the annotation server; and
store the annotation data in the database of the annotation server.

\* \* \* \* \*